United States Patent
Campbell

(10) Patent No.: US 12,434,181 B1
(45) Date of Patent: Oct. 7, 2025

(54) AIR CLEANER AND FILTRATION ASSEMBLIES

(71) Applicant: Donaldson Company, Inc., Bloomington, MN (US)

(72) Inventor: Steven K. Campbell, Lakeville, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

(21) Appl. No.: 19/210,917

(22) Filed: May 16, 2025

Related U.S. Application Data

(60) Provisional application No. 63/768,562, filed on Mar. 7, 2025, provisional application No. 63/715,456, filed on Nov. 1, 2024.

(51) Int. Cl.
*B01D 46/00* (2022.01)
*B01D 46/24* (2006.01)
*F02M 35/02* (2006.01)

(52) U.S. Cl.
CPC ...... *B01D 46/0005* (2013.01); *B01D 46/2411* (2013.01); *F02M 35/0205* (2013.01);
(Continued)

(58) Field of Classification Search
CPC ........... B01D 46/0004; B01D 46/0005; B01D 46/2411; B01D 46/2414; B01D 2265/025;
(Continued)

(56) References Cited

U.S. PATENT DOCUMENTS

| 4,159,197 A | 6/1979 | Schuler et al. |
| 4,925,561 A | 5/1990 | Ishii et al. |

(Continued)

FOREIGN PATENT DOCUMENTS

| DE | 2709000 | 9/1978 |
| DE | 19838401 | 4/1999 |

(Continued)

OTHER PUBLICATIONS

International Search Report and Written Opinion for PCT/US2025/029831, mailed Jul. 10, 2025.

*Primary Examiner* — Robert Clemente
(74) *Attorney, Agent, or Firm* — Merchant & Gould P.C.

(57) ABSTRACT

An air cleaner housing can include a main body including an end wall defining a first axial opening with a first diameter; a cover removably secured to the main body such that the cover and main body cooperatively define an interior volume; and an outlet assembly secured to the main body at the location of the first axial opening and including: a first part having a first radial flange located on an interior side of the main body end wall and having a first circumferential wall structure, the first part defining a radial sealing surface for a filter cartridge; a second part coupled to the first part, the second part having a second radial flange located on an exterior side of the main body end wall and having a second circumferential wall structure, the second part defining an air inlet or outlet opening. The first and second circumferential wall structures are permanently joined together at a circumferential weld joint such that the main body end wall is between the first radial flange and the second radial flange and such that the outlet assembly is rotatable with respect to the main body.

18 Claims, 35 Drawing Sheets

(52) U.S. Cl.
CPC .... *B01D 2265/025* (2013.01); *B01D 2265/04* (2013.01); *B01D 2271/027* (2013.01); *B01D 2279/60* (2013.01)

(58) Field of Classification Search
CPC .......... B01D 2265/04; B01D 2271/027; B01D 2279/60; F02M 35/0201; F02M 35/0204; F02M 35/0205; F02M 35/02483
See application file for complete search history.

(56) References Cited

U.S. PATENT DOCUMENTS

| | | |
|---|---|---|
| 5,049,326 A | 9/1991 | Matsumoto et al. |
| 5,474,337 A | 12/1995 | Nepsund et al. |
| 5,562,825 A | 10/1996 | Yamada et al. |
| 5,613,992 A | 3/1997 | Engel |
| 5,736,040 A | 4/1998 | Duerrstein |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,882,367 A | 3/1999 | Morgan et al. |
| 5,895,574 A | 4/1999 | Friedmann et al. |
| 5,902,364 A | 5/1999 | Tokar et al. |
| 6,039,778 A | 3/2000 | Coulonvaux |
| D428,128 S | 7/2000 | Gillingham et al. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| 6,235,195 B1 | 5/2001 | Tokar |
| 6,350,291 B1 | 2/2002 | Gieseke et al. |
| 6,673,136 B2 | 1/2004 | Gillingham et al. |
| 6,837,920 B2 | 1/2005 | Gieseke et al. |
| 7,282,077 B2 | 10/2007 | Honisch et al. |
| 7,520,913 B2 | 4/2009 | Mills et al. |
| 7,625,419 B2 | 12/2009 | Nelson et al. |
| 7,897,046 B2 | 3/2011 | Fick |
| 8,147,576 B2 | 4/2012 | Gillenberg et al. |
| 8,152,876 B2 | 4/2012 | Gillenberg et al. |
| 8,163,056 B2 | 4/2012 | Coulonvaux et al. |
| 8,354,023 B2 | 1/2013 | Wallerstorfer et al. |
| 8,424,686 B2 | 4/2013 | Ehrenberg et al. |
| 8,479,924 B2 | 7/2013 | Mbadinga-Mouanda et al. |
| 8,524,078 B2 | 9/2013 | Wawrla et al. |
| 9,089,805 B2 | 7/2015 | Lepine et al. |
| 9,254,457 B2 | 2/2016 | Kaufmann et al. |
| 9,498,743 B2 | 11/2016 | Dhiman et al. |
| 9,776,118 B2 | 10/2017 | Fedak |
| 9,919,254 B2 | 3/2018 | Campbell et al. |
| 9,919,256 B2 | 3/2018 | Mbadinga-Mouanda et al. |
| 9,932,943 B2 | 4/2018 | Brown et al. |
| 10,137,390 B2 | 11/2018 | Jokschas et al. |
| 10,518,198 B2 | 12/2019 | Page et al. |
| 10,576,403 B2 | 3/2020 | Osendorf et al. |
| 10,589,203 B1 | 3/2020 | Golinsky et al. |
| 10,744,444 B2 | 8/2020 | Fritzsching et al. |
| 10,874,970 B2 | 12/2020 | Malgorn et al. |
| 11,215,205 B2 | 1/2022 | Pastori |
| 11,331,612 B2 | 5/2022 | Movia et al. |
| 11,426,691 B2 | 8/2022 | Decoster et al. |
| 11,486,411 B2 | 11/2022 | Purdey |
| 11,773,812 B2 | 10/2023 | Holzmann et al. |
| 11,969,686 B2 | 4/2024 | Schwartz et al. |
| 11,969,687 B2 | 4/2024 | Holzmann et al. |
| 11,975,283 B2 | 5/2024 | Louison et al. |
| 11,975,284 B2 | 5/2024 | Baseotto et al. |
| 12,076,676 B2 | 9/2024 | Bannister et al. |
| 2004/0104537 A1 | 6/2004 | McArthy |
| 2004/0187689 A1 | 9/2004 | Sporre et al. |
| 2005/0130508 A1 | 6/2005 | Yeh |
| 2007/0222218 A1 | 9/2007 | Dworatzek et al. |
| 2008/0092501 A1 | 4/2008 | Sporre et al. |
| 2008/0282890 A1 | 11/2008 | Rocklitz et al. |
| 2009/0127211 A1 | 5/2009 | Rocklitz et al. |
| 2010/0032365 A1 | 2/2010 | Moe et al. |
| 2012/0060453 A1 | 3/2012 | Holzmann et al. |
| 2014/0165834 A1 | 6/2014 | Kaufmann et al. |
| 2014/0208705 A1 | 7/2014 | Krull |
| 2015/0101298 A1* | 4/2015 | Osendorf ........... B01D 46/2414 55/502 |
| 2018/0207566 A1 | 7/2018 | Stanhope et al. |
| 2020/0038795 A1* | 2/2020 | Adamek ................ B01D 50/20 |
| 2020/0155988 A1* | 5/2020 | Campbell .......... B01D 46/0005 |
| 2020/0406181 A1* | 12/2020 | Corvec ............... B01D 46/2414 |
| 2021/0275954 A1* | 9/2021 | Malgorn ................ B01D 17/10 |
| 2021/0379522 A1 | 12/2021 | Von Seggern et al. |
| 2022/0305421 A1 | 9/2022 | Wijadi et al. |
| 2022/0387921 A1 | 12/2022 | Louison |
| 2023/0032889 A1 | 2/2023 | Holzmann et al. |
| 2023/0149842 A1 | 5/2023 | Schmid et al. |
| 2023/0166207 A1 | 6/2023 | Louison et al. |
| 2023/0256372 A1* | 8/2023 | Englmaier ......... B01D 46/0004 55/502 |
| 2023/0264129 A1 | 8/2023 | Cesar Proenca Ribeiro et al. |
| 2023/0264130 A1 | 8/2023 | Canik |
| 2024/0066452 A1 | 2/2024 | Burton et al. |
| 2024/0109015 A1 | 4/2024 | Epli et al. |
| 2024/0238713 A1 | 7/2024 | Finn |
| 2024/0269599 A1 | 8/2024 | Louison et al. |

FOREIGN PATENT DOCUMENTS

| | | |
|---|---|---|
| DE | 19944344 | 3/2000 |
| DE | 102004033550 | 2/2006 |
| DE | 102009060517 | 7/2010 |
| DE | 202009018835 | 11/2013 |
| DE | 102014007118 | 11/2014 |
| DE | 102013014498 | 3/2015 |
| EP | 0867215 | 9/1998 |
| EP | 1106232 | 6/2001 |
| EP | 1144078 | 4/2003 |
| EP | 1520611 | 4/2005 |
| EP | 2764904 | 8/2014 |
| EP | 3549654 | 10/2019 |
| EP | 3892352 | 10/2021 |
| EP | 4335532 | 3/2024 |
| FR | 2573322 | 5/1986 |
| GB | 1327382 | 8/1973 |
| WO | 9740918 | 11/1997 |
| WO | 200347722 | 6/2003 |
| WO | 2004007054 | 1/2004 |
| WO | 2004082795 | 9/2004 |
| WO | 2005077487 | 8/2005 |
| WO | 2012172019 | 12/2012 |
| WO | 2013063497 | 5/2013 |
| WO | 2016077377 | 5/2016 |
| WO | 2017139673 | 8/2017 |
| WO | 2020163756 | 8/2020 |
| WO | 2024254498 | 12/2024 |
| WO | 2025085786 | 4/2025 |

* cited by examiner

AIR CLEANER AND FILTRATION ASSEMBLIES

RELATED APPLICATIONS

This application claims the benefit of U.S. Provisional Application Ser. No. 63/768,562, filed on Mar. 7, 2025; and U.S. Provisional Application Ser. No. 63/715,456, filed on Nov. 1, 2024, the disclosures of which are hereby incorporated by reference in their entireties.

FIELD OF THE DISCLOSURE

The present disclosure relates to the field of gas filtration, such as for instance air filtration. It relates to the field of filter assemblies comprising a filter element which is arranged in a filter housing in a sealing manner, such that air passing from an inlet of the housing to an outlet of the housing is filtered by the filter element. Preferably the assemblies are used for filtering air that is afterwards directed to an engine of for instance a vehicle.

BACKGROUND

Filter elements, also named filter cartridges, are used for a wide variety of filtering applications and the fluid to be filtered can be a liquid or a gas, e.g., air.

Indeed, in many instances, it is desired to filter contaminant material from a fluid stream. For example, airflow streams to engines for motorized vehicles or for power generation equipment, construction equipment or other equipment, gas streams to gas turbine systems and air streams to various combustion furnaces, carry particulate contaminant therein. It is preferred for such systems that contaminant materials be removed from the fluid or at least be reduced.

Filter elements comprise filter media for removing contaminant materials when the fluid flows through the filter media. Commonly used and commercially available filter media are for example pleated media or fluted media. When the filter media is loaded with dust and/or particles above a certain threshold load, a filter element needs to be replaced. Filter elements are typically installed in the housing in a replaceable manner.

There is a need in industry for new solutions which allow an easy installation of a correct filter element in a filter housing, especially complex filter housing designs, and which would not allow the installation of a wrong filter element. Complex filter housing designs can for instance be a result of boundary conditions imposed by the geometry and positioning of other vehicle/engine components.

SUMMARY

An air cleaner housing can include a main body including an end wall defining a first axial opening with a first diameter; the housing can define an interior volume; and an outlet assembly secured to the main body at the location of the first axial opening and including: a first part having a first radial flange located on an interior side of the main body end wall and having a first circumferential wall structure, the first part defining a radial sealing surface for a filter cartridge; a second part coupled to the first part, the second part having a second radial flange located on an exterior side of the main body end wall and having a second circumferential wall structure, the second part defining an air inlet or outlet opening; wherein the first and second circumferential wall structures are permanently joined together at a circumferential weld joint such that the main body end wall is between the first radial flange and the second radial flange and such that the outlet assembly is rotatable with respect to the main body. A cover may be optionally provided that is removably secured to the main body.

In some examples, a third circumferential wall structure is located on either of the first and second parts and arranged such that the first, second, and third circumferential wall structures form a tongue and groove circumferential weld joint.

In some examples, the main body defines a third circumferential wall structure located adjacent to an outer edge of the first or second radial flange.

In some examples, the first part defines a third circumferential wall structure and the second part defines a fourth circumferential wall structure, wherein distal ends of the third and fourth circumferential wall structures are coaxially aligned and extend towards each other.

In some examples, an innermost diameter of the circumferential weld joint is greater than an inside diameter of the air inlet or outlet opening of the second part.

An air cleaner housing can include a main body including an end wall defining a first axial opening with a first diameter; a cover removably secured to the main body such that the cover and main body cooperatively define an interior volume; and an outlet assembly secured to the main body at the location of the first axial opening and including: a first part having a maximum radial dimension that is greater than the first diameter and is located on an interior side of the main body end wall, the first part defining a radial sealing surface; a second part coupled to the first part, the second part having a maximum dimension that is greater than the first diameter and located on an exterior side of the main body end wall, the second part defining an air inlet or outlet opening; wherein the first part and the second part are permanently joined together at a circumferential weld joint such that the main body end wall is between the first and second parts and such that the outlet assembly is rotatable with respect to the main body.

In some examples, the circumferential weld joint has a radial component.

In some examples, the first and second parts are each formed from a polymeric material.

In some examples, the first and second parts are each formed from a polypropylene or acrylonitrile butadiene styrene (ABS) material.

In some examples, the circumferential weld joint is located at an interface between a first circumferential wall structure associated with the first part and a second circumferential wall structure associated with the second part.

In some examples, one of the first and second circumferential wall structures defines a tongue and the other of the first and second circumferential wall structures defines a groove, and wherein the circumferential weld joint is formed between the tongue and groove.

In some examples, the tongue is associated with the first wall structure and the groove is associated with the second wall structure.

In some examples, the tongue is associated with the second wall structure and the groove is associated with the first wall structure.

In some examples, the first or second part defines a third wall structure and the main body end wall defines a fourth wall structure, wherein the third and fourth wall structures are slidable with respect to each other to form cooperating guide surfaces.

In some examples, the one of the third and fourth circumferential wall structures defines a tongue and the other of the third and fourth circumferential wall structures defines a groove.

In some examples, the tongue is associated with the third wall structure and the groove is associated with the fourth wall structure.

In some examples, the tongue is associated with the fourth wall structure and the groove is associated with the third wall structure.

In some examples, the third and fourth wall structures are located radially outward from the first and second wall structures.

In some examples, the first part defines the third circumferential wall structure and wherein the fourth circumferential wall structure is located on the interior side of the end wall structure.

In some examples, the second part defines the third circumferential wall structure and wherein the fourth circumferential wall structure is located on the exterior side of the end wall structure.

A method of manufacturing an air cleaner housing can include providing a main body including an end wall defining a first axial opening with a first diameter; providing a first part having a maximum radial dimension greater than the first diameter; providing a second part having a maximum radial dimension greater than the first diameter and defining an air outlet opening; positioning the first part on an interior side of the main body end wall; positioning the second part on an exterior side of the main body end wall such that the main body end wall is between the first and second parts; rotating the first or second part relative to the other of the first and second part in a spin welding process to permanently join the first part and the second part together at a circumferential weld joint, wherein the resulting outlet assembly is rotatable with respect to the main body.

In some examples, the method further includes fixing one of the first and second parts against rotation.

In some examples, the step of fixing one of the first and second parts against rotation includes fixing the first part.

In some examples, the step of fixing one of the first and second parts against rotation includes fixing the second part.

In some examples, the method further includes fixing the main body against rotation.

In some examples, the method further includes, after the rotating step, holding the first and second parts together under pressure for a period of time.

The present invention is defined, at least in part, in the appended independent claims. The dependent claims define advantageous embodiments.

BRIEF DESCRIPTION OF THE DRAWINGS

These and further aspects of the present disclosure will be explained in greater detail by way of example and with reference to the accompanying drawings in which.

Figure 1:
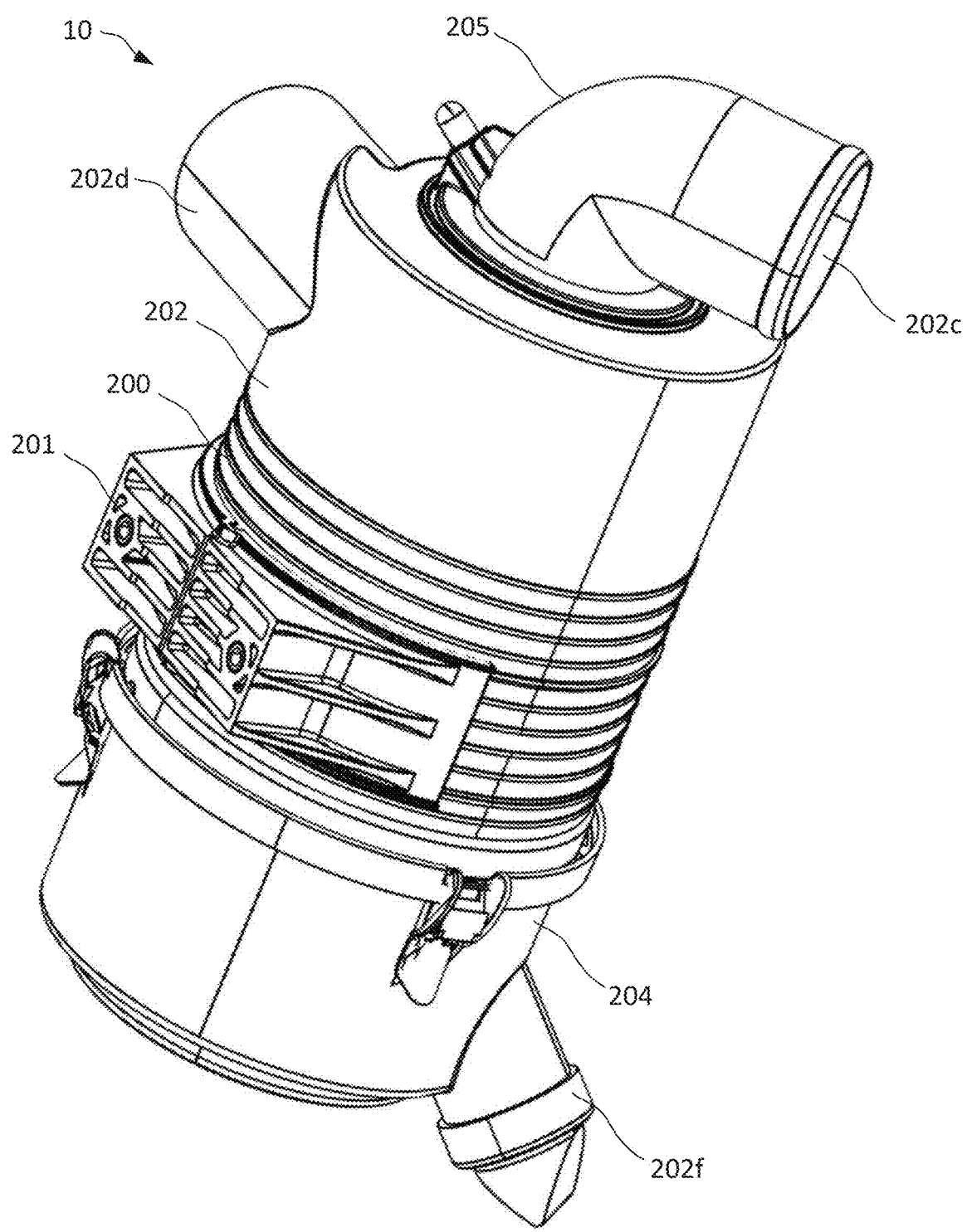
FIG. 1 is a schematic view of a first example of an air cleaner assembly, with an outlet tube assembly, having features in accordance with the present disclosure.

The drawings of the figures are neither drawn to scale nor proportioned. Generally, identical components are denoted by the same reference numerals in the figures. Further, it is noted that many of the drawings presented herein are generated from computer-aided design (CAD) models that show parts in their nominal, undeformed states. In particular, for assembly views showing a filter cartridge installed within the housing, the seal member is depicted in its relaxed condition even though it would actually be compressed and/or stretched when installed against the outlet tube or other sealing surfaces associated with the air cleaner assembly. For example, in some views the seal member may appear to overlap with or intersect the outlet tube or seal plate geometry since the seal is shown in its pre-installation state rather than its deformed, installed state. A person having ordinary skill in the art would readily understand that such visual overlaps or intersections in the drawings represent the undeformed components and would interpret the drawings taking into account the compressible and/or stretchable nature of the seal member materials during actual installation and use.

DETAILED DESCRIPTION

The present disclosure will be described in terms of specific embodiments, which are illustrative of the disclosure and not to be construed as limiting. It will be appreciated by persons skilled in the art that the present disclosure is not limited by what has been particularly shown and/or described and that alternatives or modified embodiments could be developed in the light of the overall teaching of this disclosure. The drawings described are only schematic and are non-limiting.

Use of the verb "to comprise", as well as the respective conjugations, does not exclude the presence of elements other than those stated. Use of the article "a", "an" or "the" preceding an element does not exclude the presence of a plurality of such elements.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Reference throughout this specification to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one ordinary skill in the art from this disclosure, in one or more embodiments.

As used herein, the term "axially" generally refers to a direction that is parallel to the longitudinal axis X while the term "radially" generally refers to a direction that is orthogonal to the longitudinal axis X. As also used herein, the term "radially inward" generally refers to a direction facing towards the longitudinal axis X while the term "radially outward" generally refers to a direction facing away from the longitudinal axis X.

Although a number of the drawings presented and discussed below are specifically addressing embodiments of a filter element for filtering air, the present disclosure is not limited thereto.

Figure 66:
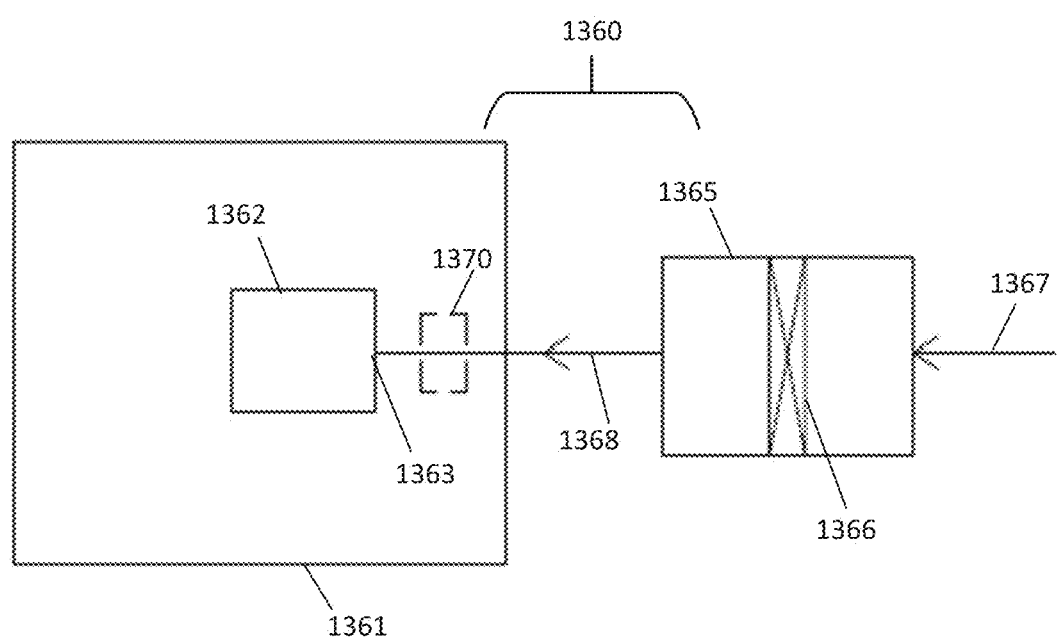
FIG. 66 is a schematic depiction of an equipment assembly including an air cleaner assembly in accordance with any of the air cleaner assemblies disclosed herein.

In FIG. 66, a schematic depiction of an engine equipment arrangement 1360 is depicted. The equipment system 1360, in the example, comprises a vehicle or other equipment 1361 having an internal combustion engine arrangement 1362 with a combustion air intake 1363. The equipment arrangement 1360 includes an air cleaner system 1365 having a filter arrangement 1366 therein, typically comprising a serviceable (i.e., removable and replaceable) filter cartridge. The air cleaner system 1365 and filter arrangement 1366 can include any of the below-described air cleaners and filter cartridges, and combinations thereof. Intake air to the system is shown at 1367 directed into the air cleaner assembly 1365 before filtering of unfiltered air through media of the filter cartridge arrangement 1366. At 1368, filtered air is shown being directed into the equipment air intake 1363. At 1370, optional equipment such as turbo system is shown. Of course, alternate equipment systems can be represented by arrangements analogous to those of FIG. 66. The equipment system can be for example, an industrial air filter, an air cleaner arrangement used in association with a turbine, etc. The use in association with an internal combustion engine is typical, but not specifically required for many of the principles characterized herein.

Air Cleaner 10

Referring to FIGS. 1 to 4, aspects of an air cleaner 10 are presented. In one aspect, the air cleaner assembly 10 includes an air cleaner housing 200 defining an interior volume within which a first filter cartridge 100 and a second filter cartridge 150 are disposed. It is noted that the air cleaner 10 can be configured such that only one of the first and second filter cartridges 100, 150 is provided. The air cleaner housing 200 is shown as being provided with a main housing body 202 and a cover 204. A mounting structure 201 for mounting the main housing body 202 to another structure is also shown. The air cleaner housing 200 also includes a rotatable outlet tube assembly 205 having joined together first and second parts 208, 210, as is explained in greater detail below. In one aspect, the first part 208 may be referred to as an inlet or outlet 208 while the second part 210 may be referred to as a receiver plate 210 or a sealing plate 210, wherein each defines a central opening for allowing air to pass therethrough. The air cleaner assembly 10 is also provided with an air inlet 202d. In some examples, assembly 205 can be configured as an air inlet while structure 202d can be configured as an air outlet.

In one aspect, the filter cartridge 100 includes filter media 102 extending between a first end cap 104 and a second end cap 106. In the particular example shown, the filter media 102 is pleated media arranged in a tubular manner to define a central opening 102c around an axis X. The filter cartridge 150 is similarly so constructed with filter media 152, a first end cap 153, and a second end cap 154, and is installed within the filter cartridge 100. As configured, each of the end caps 102, 154 forms a seal with the outlet tube assembly 205 such that air passing through the filter cartridge 100 must also pass through the filter cartridge 150 before exiting the housing assembly via outlet 202c. It is noted that the outlet 202c is formed as an elbow such that the end of the outlet faces in a radial direction relative to the longitudinal axis X of the air cleaner. However, other configurations are possible, including those where the outlet 202c is straight and has an end facing in an axial direction.

In one aspect, the first end cap 104 is an open end cap and is connected to a first axial end 102a of the filter media 102 in a fluid tight manner. In one aspect, the second end cap 106 is a closed end cap and is connected to a second axial end 102b of the filter media 102 in a fluid tight manner. The first and second end caps 104, 106 can, for instance, be formed and attached to the filter cartridge 100 by a polyurethane potting process. In one aspect, the outermost portions of the end caps 104, 106, are generally annular or circular. The filter media 102 is also shown as being provided with an annular or circular shape with a hollow interior. Other shapes for the end caps 104, 106 and filter media 102 are possible, for example, elliptical shapes, obround, oval or race-track shapes, and/or conical shapes. In one aspect, the first end cap 104 is an open end cap and has a seal member 156 presenting a radially inward facing sealing surface 110a defined by a plurality of flat sides 110c and adjoining rounded corner portions 110d. Accordingly, the sealing surface 110a of the end cap 104 may be characterized as having a generally polygonal shape. In the example shown, eight flat sides 110c and eight corner portions 110d are provided that are aligned with flat sides 212e and corner portions 212f of a seal surface 212d on the outlet tube assembly second part 210. More or fewer sides may be provided.

Figure 2:
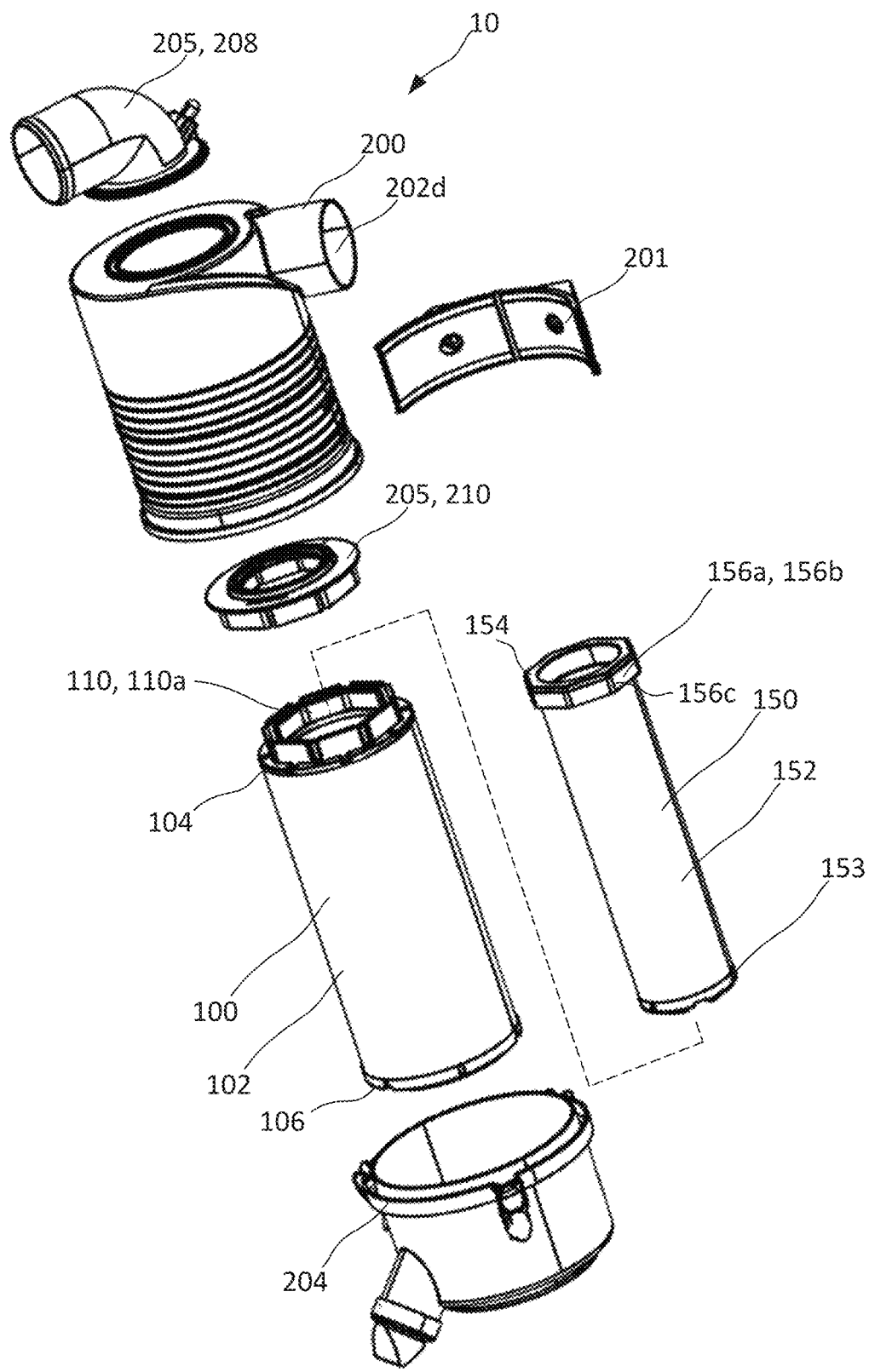
FIG. 2 is a perspective exploded view of the air cleaner assembly shown in FIG. 1.
Figure 3:
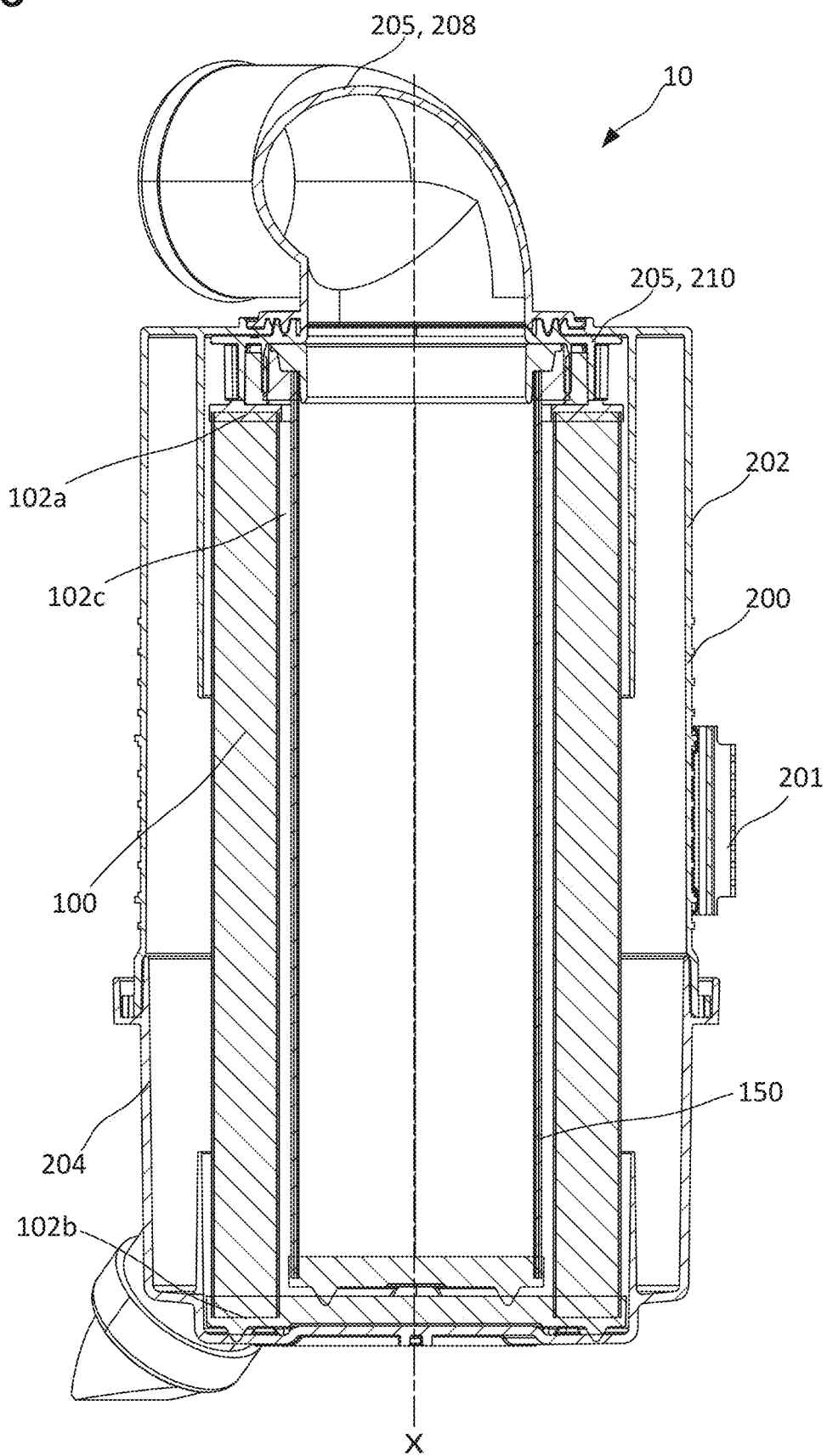
FIG. 3 is a cross-sectional side view of the air cleaner assembly shown in FIG. 1.

With continued reference to FIG. 2, the safety filter cartridge 150 is provided with filter media 152 extending between the first end cap 153 and the second end cap 154. In the particular example shown, the filter media 152 is non-woven media arranged in a tubular manner to define a central opening and is supported by an internal liner. In one aspect, the second end cap 154 is an open end cap and has a seal member 156 presenting a radially outward facing sealing surface 156a defined by a plurality of flat sides 156b and adjoining rounded corner portions 156c. Accordingly, the sealing surface 156a of the second end cap 154 may be characterized as having a generally polygonal shape. In the example shown, eight flat sides 156b and six corner portions 156c are provided that are aligned with the flat sides 212e and corner portions 212f of the seal surface 212d on the outlet tube assembly second part 210. More or fewer sides may be provided.

It is noted that the above-described concepts, features, and alternatives for filter cartridges 100 and 150 are interchangeable such that features shown and described for filter cartridge 100 are applicable to filter cartridge 150, and vice versa. Further, each of the above-described examples having generally polygonal shapes may be provided with any suitable number of sides and corner portions and are not constrained to any particular number of sides.

Outlet Tube Assembly 205

Figure 4:
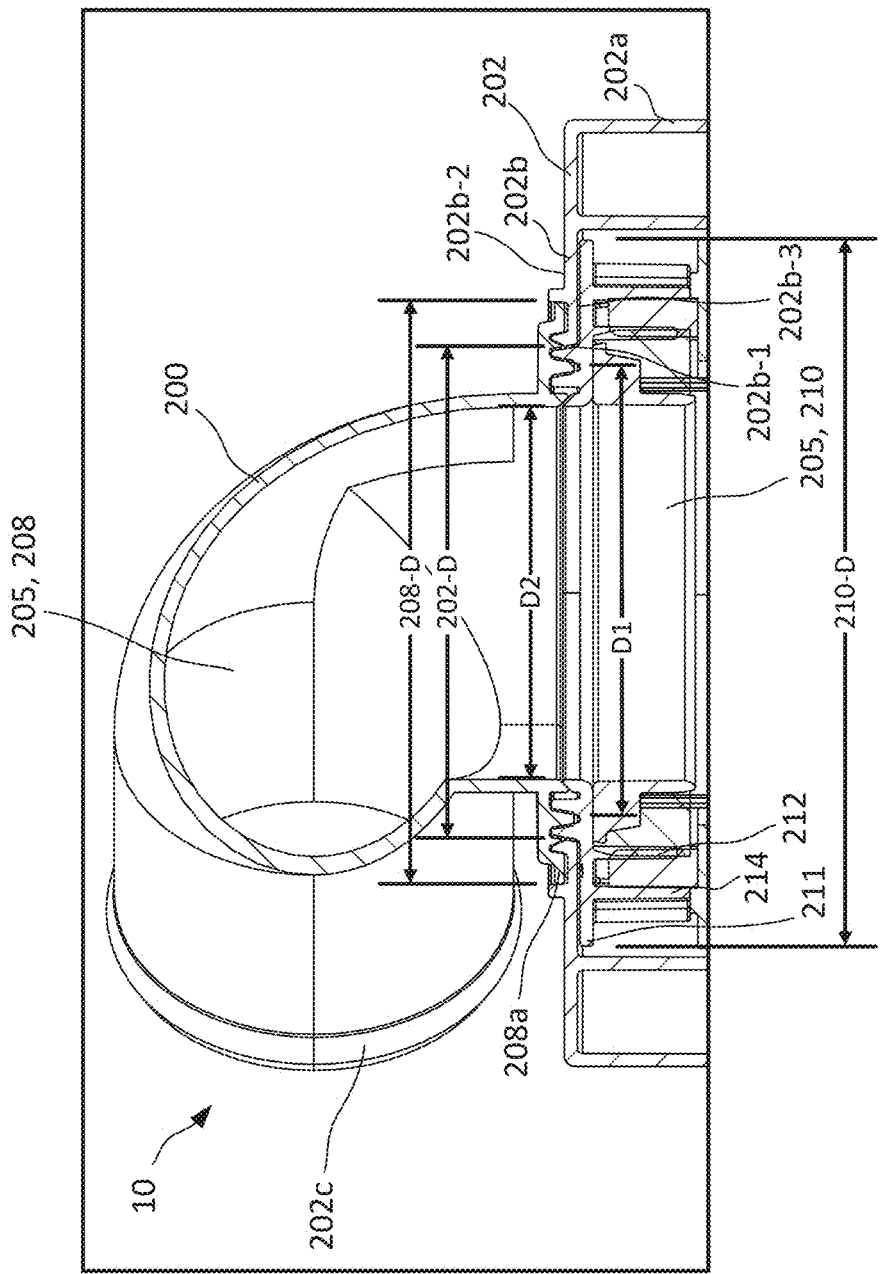
FIG. 4 is an enlarged portion of the cross-sectional side view presented in FIG. 3 with the filter cartridges removed from the air cleaner assembly.
Figure 5:
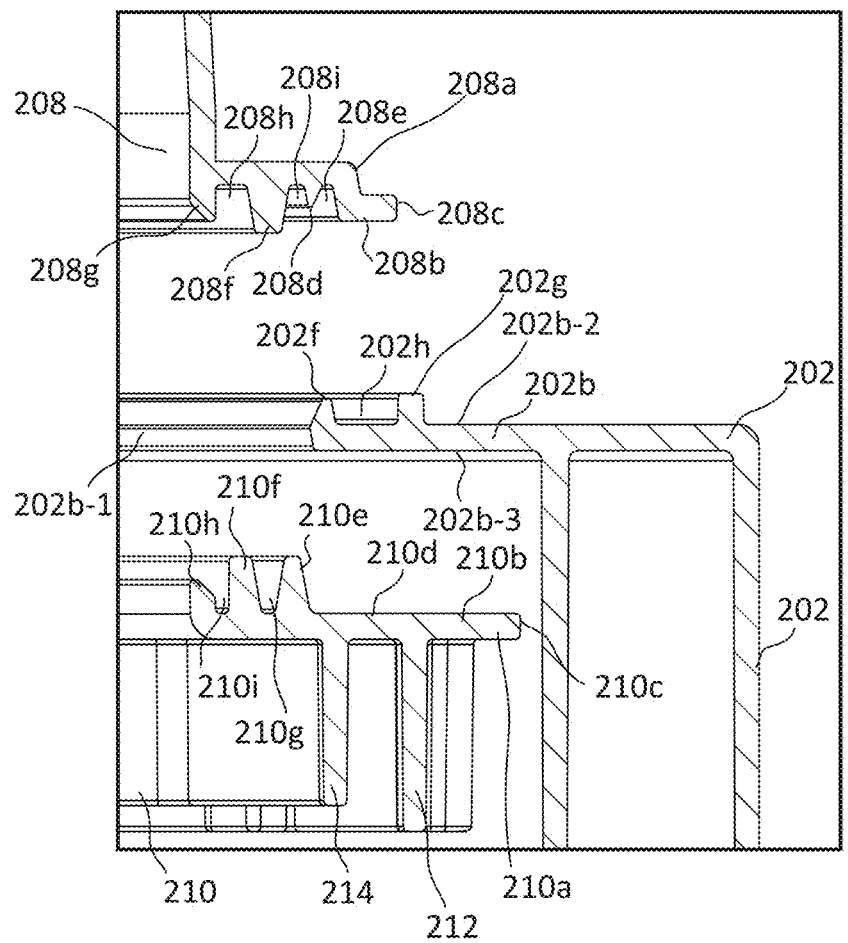
FIG. 5 is an enlarged portion of the view provided in FIG. 4 with the outlet tube assembly components shown in a detached state.
Figure 6:
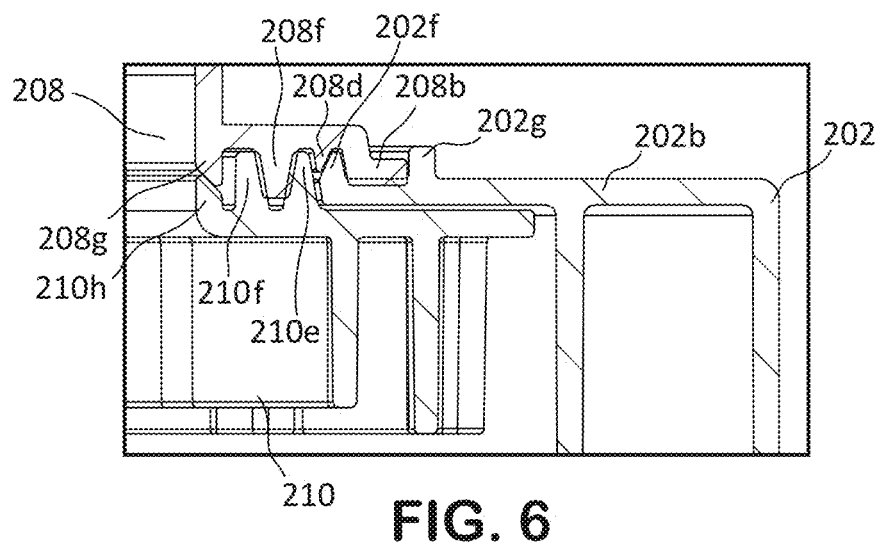
FIG. 6 is an enlarged portion of the view provided in FIG. 4.

Referring to FIGS. 4 to 6, the outlet tube assembly 205 is shown in greater detail. As noted above, the outlet tube assembly 205 includes a first part 208 and a second part 210 that are joined together to form an assembly that is rotatable with respect to the main housing body 202. As most easily seen at FIG. 4, the main housing body 202 defines an outer sidewall 202*a* and an end wall 202*b* defining an opening 202*b*-1 having a dimension or diameter 202-D. The end wall 202*b* and opening 202*b*-1 may be characterized as being an axial end wall 202*b* and an axial opening 202*b*-1 as they extend orthogonally to the longitudinal axis X and thus face in an axial direction. As shown, the first part 208 includes a flange wall 208*a* adjacent an exterior side 202*b*-2 of the end wall 202*b* while the second part 210 includes a flange wall 210*a* adjacent an interior side 202*b*-3 of the end wall 202*b*. The flange wall 208*a* has a dimension or diameter 208-D and the flange wall 210*a* has a dimension or diameter 210-D that each represent a maximum overall diameter of the first and second parts 208, 210, respectively. The dimensions 208-D and 210-D are also greater than the dimension 202-D. Accordingly, the flange walls 208*a*, 210*a* prevent the first and second parts 208, 210 from being able to pass through the opening 202-D. When joined together, the first and second parts 208, 210 clamp the end wall 202*b* between the flange walls 208*a*, 210*a*, but in such a way that allows the flanges 208*a*, 210*a* to slide with respect to the surfaces 202*b*-2, 202*b*-3 of the end wall 202*b*.

Figure 7:
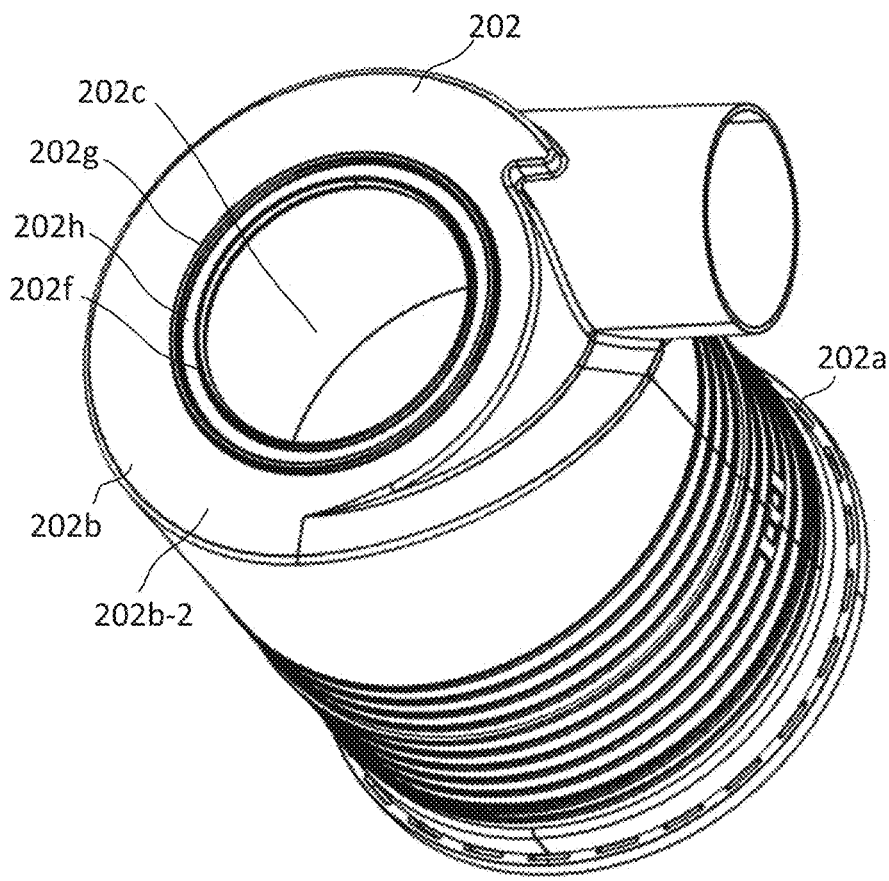
FIG. 7 is a perspective view of a housing body of the air cleaner shown in FIG. 1.
Figure 8:
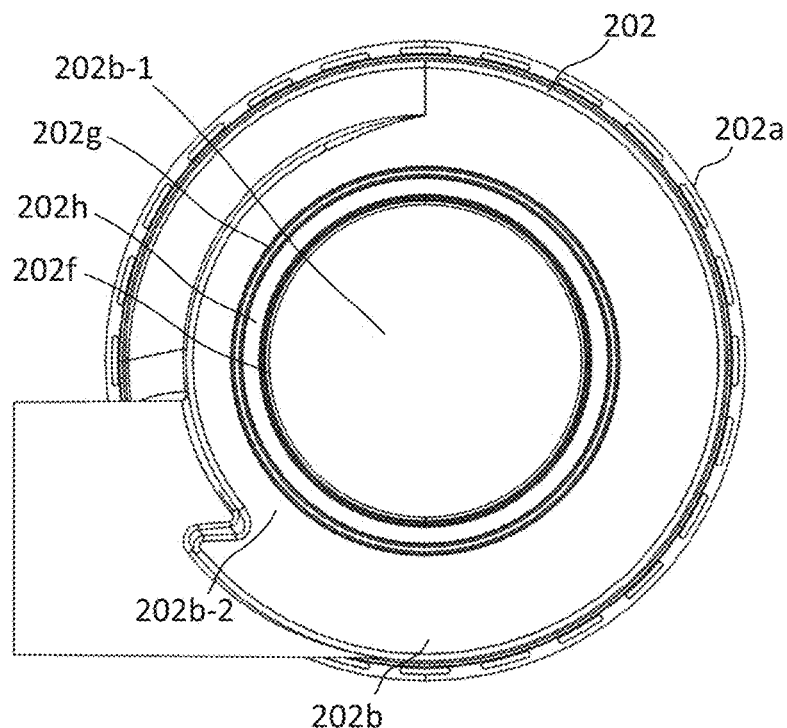
FIG. 8 is an end view of the housing body shown in FIG. 7.

As more fully detailed at FIGS. 5 and 6, in addition to FIGS. 7 and 8 which show the main housing body 202 in isolation, it can be seen that the main housing body 202 further includes a first circumferential wall structure 202*f* and a second circumferential wall structure 202*g* that extend axially from the end wall 202*b*. The wall structures 202*f*, 202*g* and the portion of the exterior surface 202*b*-2 extending between the wall structures 202*f*, 202*g* cooperatively define an annular groove or recess 202*h*. In one aspect, the wall structure 202*g* has a generally rectangular cross-sectional shape with a relatively flat distal end while the wall structure 202*f* has a tapered cross-sectional shape with a relatively pointed distal end.

Figure 9:
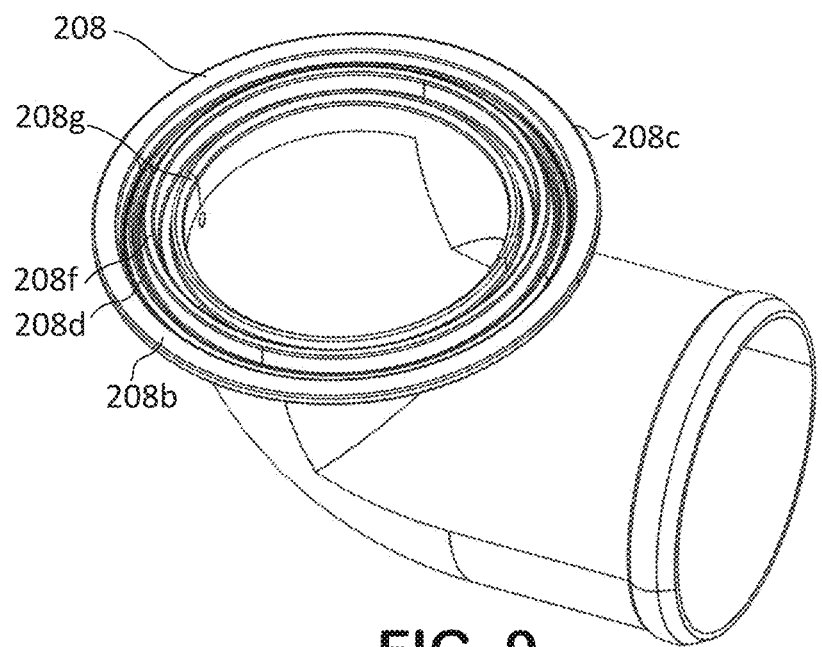
FIG. 9 is a perspective view of a first part of the outlet tube assembly shown in FIG. 1.
Figure 10:
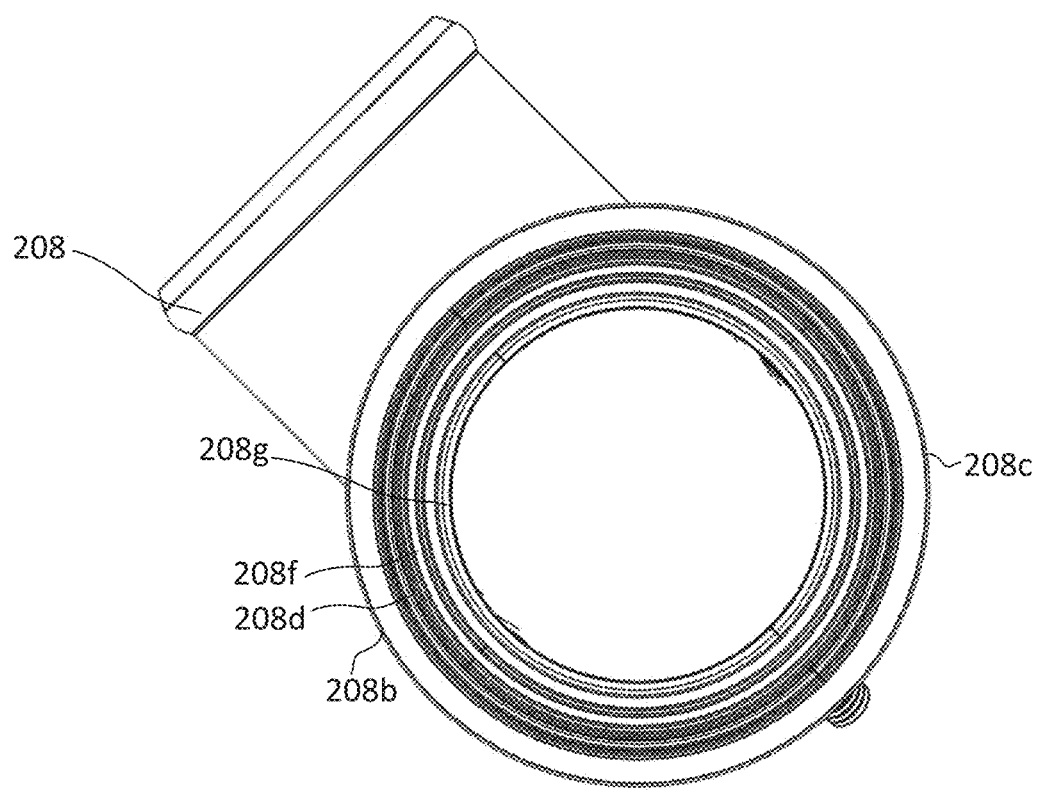
FIG. 10 is an end view of the first part shown in FIG. 9.
Figure 11:
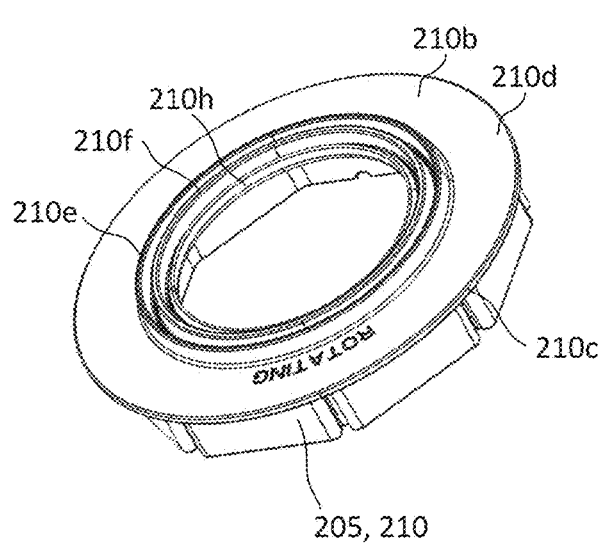
FIG. 11 is a first perspective view of a second part of the outlet tube assembly shown in FIG. 1.
Figure 12:
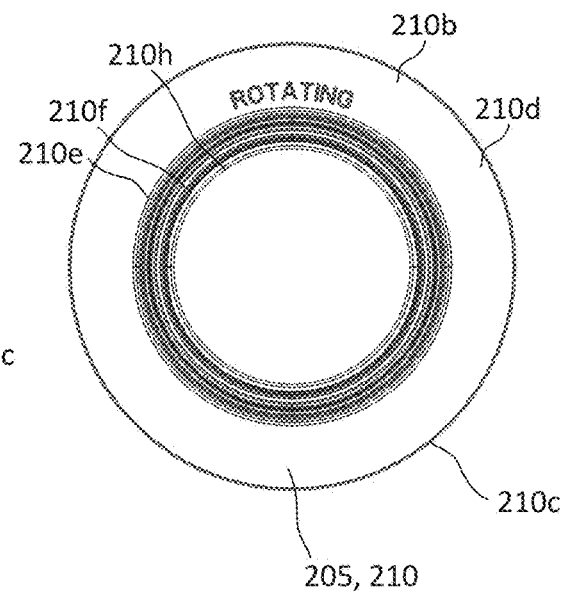
FIG. 12 is a first end view of the second part shown in FIG. 11.
Figure 13:
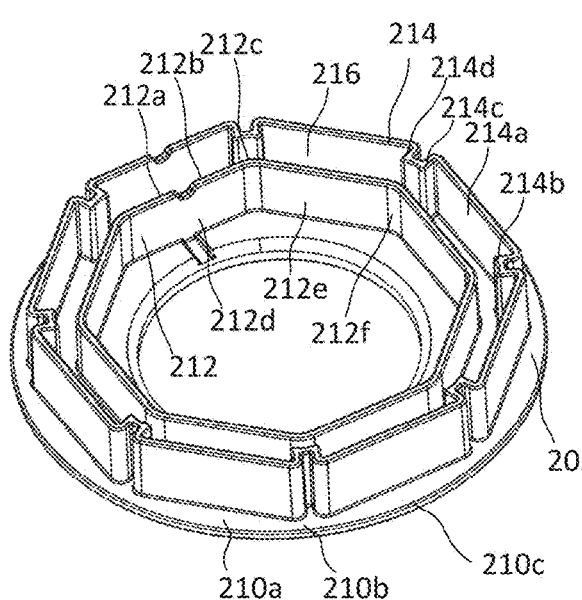
FIG. 13 is a second perspective view of the second part shown in FIG. 11.
Figure 14:
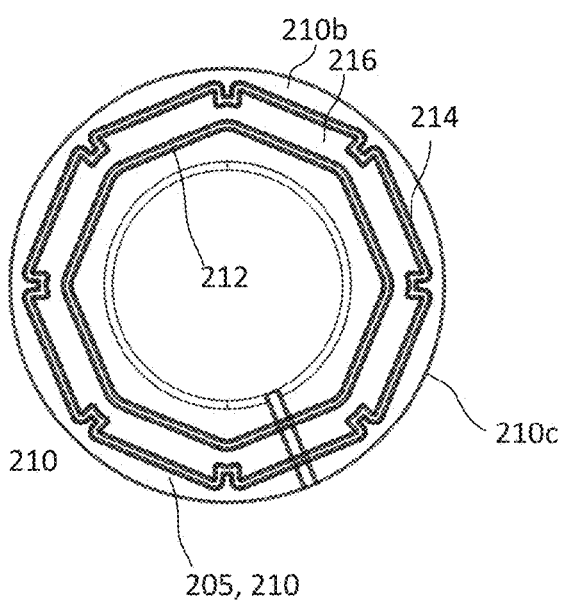
FIG. 14 is a second end view of the second part shown in FIG. 11.

With continued reference to FIGS. 5 and 6, in addition to FIGS. 9 and 10 which show the first part 208 in isolation, features of the flange wall 208*a* of the first part 208 can be seen in further detail. As shown, the flange wall 208*a* includes a circumferential wall structure 208*b* that extends axially in a downward direction and defines a radial outermost portion 208*c* of the flange wall 208*a*. The flange wall 208*a* further includes axially extending circumferential wall structures 208*d*, 208*f*, and 208*g*, each having a generally tapered cross-sectional shapes. As shown, the wall structures 208*c* and 208*d* cooperatively form an annular groove or recess 208*e*, the wall structures 208*d* and 208*f* cooperatively form an annular groove or recess 208*i*, and wall structures 208*f* and 208*g* cooperatively form an annular groove or recess 208*h*. The wall structure 208*d* also functions as a flash blocker to ensure molten material does not flow from the location of the weld joint to the sliding interface between the housing body 202 and the first part 208, such as at the interface between 208*d* and 202*f*.

With continued reference to FIGS. 5 and 6, in addition to FIGS. 11 to 14 which show the second part 210 in isolation, features of the flange wall 210*a* of the second part 210 can be seen in further detail. As shown, the flange wall 210*a* includes a radially extending, generally flat outer extension 210*b* that defines an outer distal end 210*c* of the flange wall 210*a* and an upward facing axial surface 210*d*. The flange wall 210*a* is further shown as including circumferential wall structures 210*e*, 210*f*, and 210*h* that extend axially in an upward direction and that have generally tapered cross-sectional shapes. In one aspect, the wall structures 210*e*, 210*f* form an annular groove or recess 210*g* while wall structures 210*f* and 210*h* form an annular groove or recess 210*i*. As most easily seen at FIGS. 13 and 14, the second part 210 is further shown as having a generally polygonal shaped sidewall 212 having a radially outward facing seal surface 212*a* with flat sides 212*b* and corner portions 212*c* that form a generally polygonal cross-sectional shape corresponding to the shape of the sealing surface 110*a* of the filter cartridge 100. On the opposite side of the sidewall 212, a radially inward facing seal surface 212*d* is presented with flat sides 212*e* and corner portions 212*f* that form a generally polygonal cross-sectional shape corresponding to the shape of the sealing surface of the filter cartridge 150. The second part 210 is further shown as being provided with a sidewall 214 defining a radially inward facing radial surface having a plurality of spaced apart flat sections 214*a* interrupted by inwardly extending protrusions 214*b* having side edges 214*c*, 214*d*. Taken together, the surfaces 214*a*, 214*c*, and 214*d* form recessed areas 216 that can receive the outer portion of the end cap 104 such that the protrusions 214*b* are received within the inwardly extending corner portions or gaps defined in the end cap 104. These features can also serve to rotationally align the filter cartridge 100 into the proper orientation such that the flat sides 110*c* and corner portions 110*d* are appropriately aligned with flat sides 212*b* and corner portions 212*c*. Once such alignment is achieved, the filter cartridge can drop fully into place. Other configurations are possible. For example, the sidewall 214 can be provided without the inwardly extending protrusions 214*b*. Other potential configurations for the second part 210 are described below.

As can be most easily seen at FIG. 6, the first and second parts 208, 210 can be joined together such that the end wall 202*b* of the main housing body is clamped or sandwiched between the parts 208, 210. When so joined, the features of the main housing body 202, the first part 208, and the second part 210 interact such that: (1) the wall structure 208*b* is received within the annular groove or recess 202*h* formed between wall structures 202*f* and 202*g* and exterior surface 202*b*-2; (2) the wall structure 202*f* is received by annular groove or recess 208*e*; (3) the axial surface 210*d* of the extension 210*b* abuts the interior side 202*b*-3 of the end wall 202*b*, and (4) the wall structure 210*e* extends through the opening 202*b*-1 and is adjacent a radial innermost portion of the wall structure 202*f*. With such an arrangement, the end wall 202*b* is captured by the first and second parts 208, 210 such that the annular groove or recesses 202*h* and 208*e* function as a rotational guide for the first part 208 such that the surfaces 210*d* and 202*b*-3 cooperatively interact to resist axial rotational forces imparted onto the first and second parts 208, 210, and such that any potential interaction between wall structures 210*e* and 202*f* further act as a centering and guide feature between the outlet assembly 205 and the main housing body 202. In another aspect, the wall structures 208*g* and 210*h* have the same general diameter and are coaxially aligned such that their slanted or tapered ends extend towards each other and abut, or are in close proximity, to cooperatively define a relatively smooth transition point between the parts 208, 210 across which filtered air flowing through the outlet assembly 205 can flow with little disruption. The abutting ends of the wall structures 208*g* and 202*h* can also serve to add structural stability to the connected first and second parts 208, 210.

With continued reference to FIG. 6, it can be seen that the wall structure 208*f* is received by the annular groove or recess 210*g* defined between the wall structures 210*e* and 210f while the wall structure 210e is received by the annular groove or recess 208i and the wall structure 210f is received by the annular groove or recess 208h. In one aspect, the interfaces between the wall structures 208f, 210e, and 210f form a tongue and groove joint that is a permanent weld joint. In one example, the weld joint can be formed by a rotary friction welding process, such as spin welding, in which one part is rotated against another at high speed and under a compressive force to generate heat through friction. The heat softens the plastic or metal surfaces, allowing them to fuse together as they cool, forming a strong bond through material coalescence in which an integral connection is formed with the materials of the parts being unified at their interface. This creates a permanent, non-separable bond between the first and second parts 208, 210 without relying on mechanical interlocking or fastening elements. As can be seen most easily at FIG. 4, the centerline of the weld joint between the wall structures 208f, 210e, 210f is formed at a first diameter D1 that is smaller than the opening diameter 202-D but larger than an internal diameter D2 of the outlet portion 202c of the first part 208. Other joining processes can be utilized as well, for example, high-frequency/ultrasonic welding, hot plate welding, and hot gas welding. Although potentially less preferred, adhesives could also be used to form a permanent joint between the first and second parts 208, 210.

In some examples, a weld joint can also be formed at the interface between wall structure 210e and the wall structure 208d such that a plurality of permanent weld joints are formed between the first and second parts 208, 210. Other configurations for a permanent weld joint are possible. For example, the wall structures 208f, 210e, and 210f could be squared or non-tapered to form a flanged shear joint. For example, a single weld interface, such as a shear joint with straight sides on both walls, could be formed between the wall structure 208f and only one of the wall structures 210f, 210e. It is also noted that the connecting features of the first and second parts 208, 210 could be reversed such that a primary circumferential wall forming a tongue is provided on the second part 210 and a circumferential wall structure defining a receiving groove is provided on the first part 208. In one aspect, the first and second parts 208, 210 can be dimensioned such that the surfaces 202b-3 and 210d, the ends of the wall structures 208g and 210h, and/or the faces of the wall structure 208b and the surface 202b-2 come into contact with each other to ensure that the first and second parts 208, 210 are not joined together so tightly that the resulting outlet assembly 205 is unable to rotate with respect to the main housing body 202.

Figure 15:
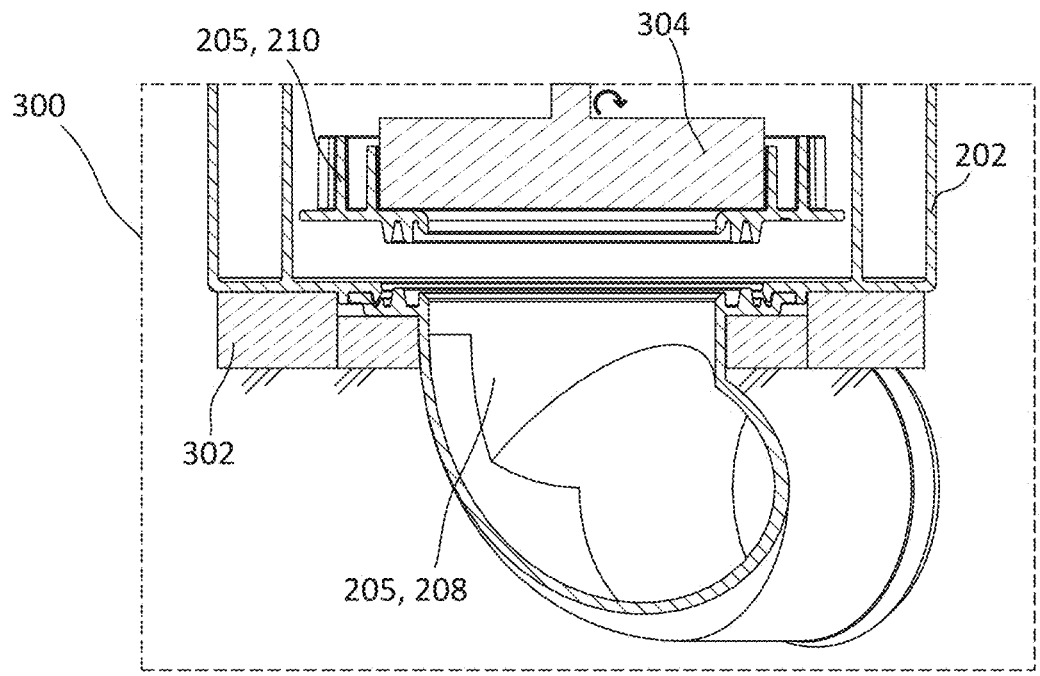
FIG. 15 is a schematic depiction of a first configuration of a spin welding apparatus and a portion of the air cleaner assembly, with the outlet tube assembly in a separated state.
Figure 16:
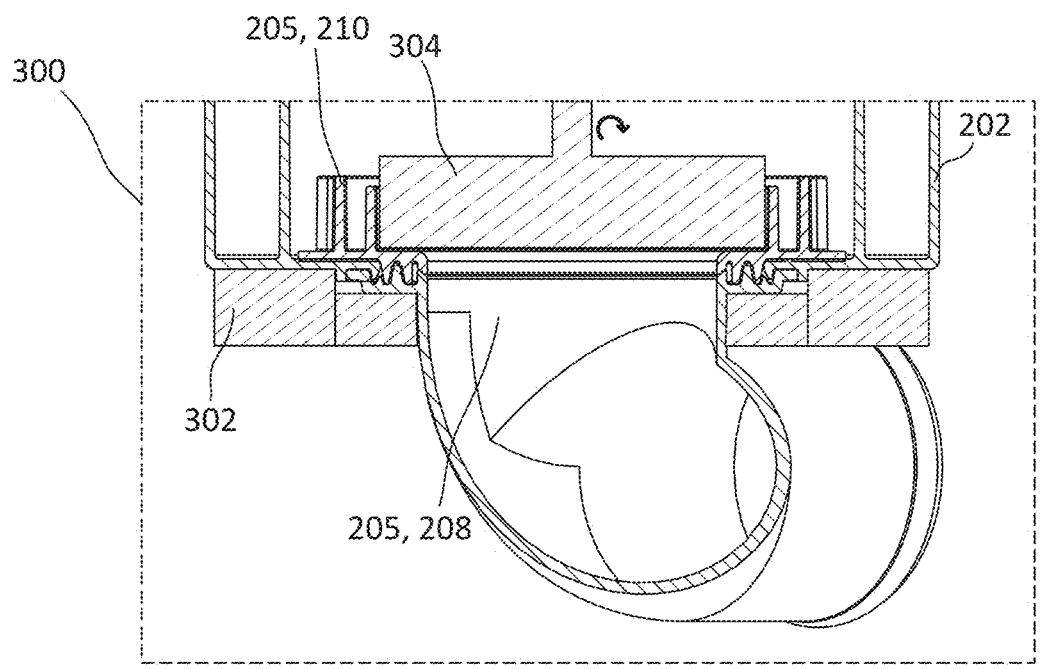
FIG. 16 is a schematic depiction of the spin welding apparatus and air cleaner assembly of FIG. 15, with the outlet tube assembly in an assembled state.
Figure 17:
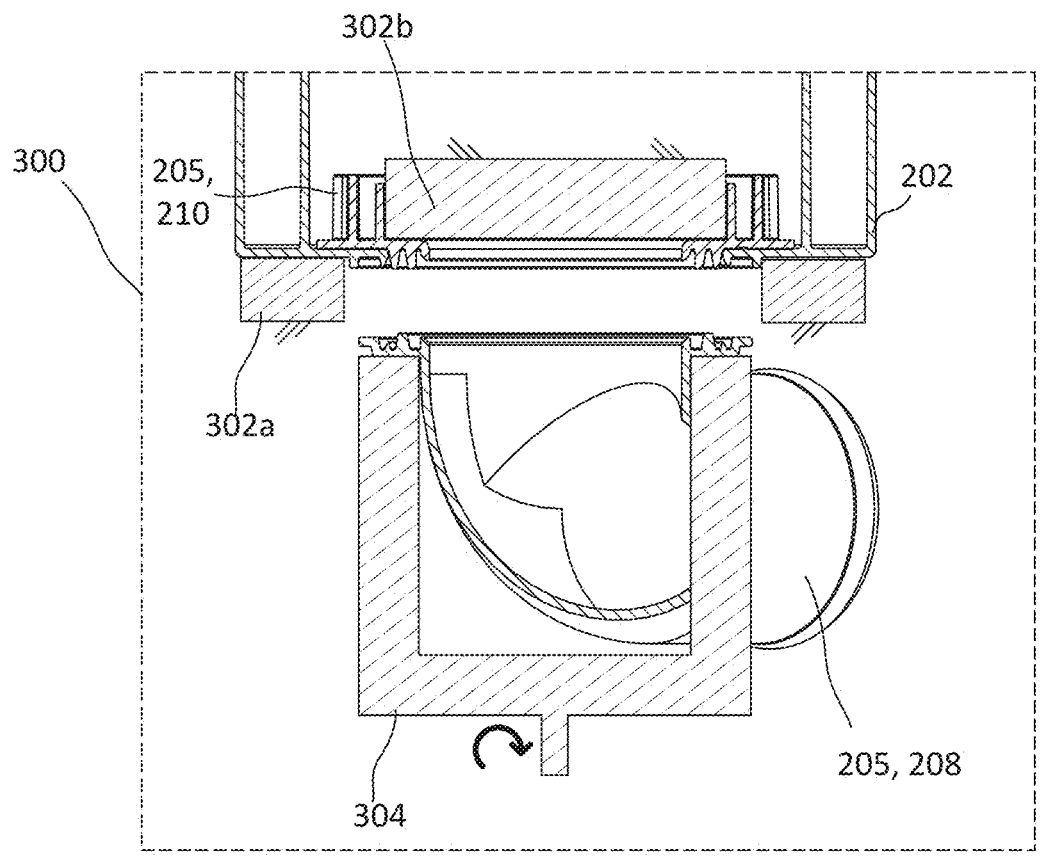
FIG. 17 is a schematic depiction of a second configuration of a spin welding apparatus and a portion of the air cleaner assembly, with the outlet tube assembly in a separated state.
Figure 18:
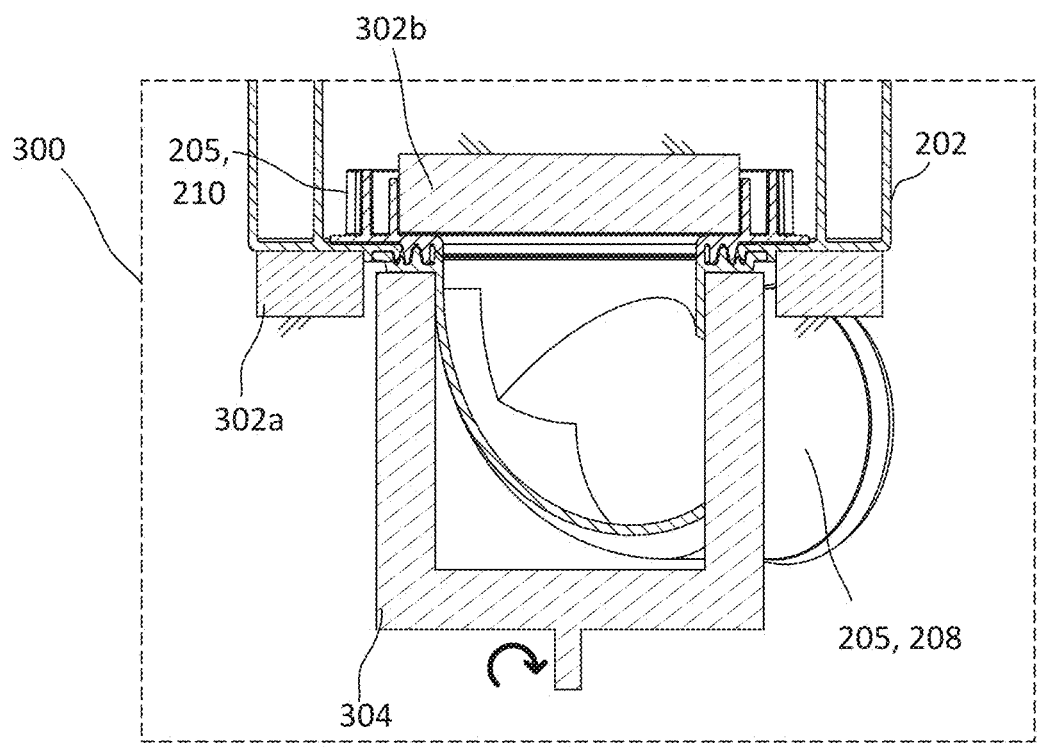
FIG. 18 is a schematic depiction of the spin welding apparatus and air cleaner assembly of FIG. 17, with the outlet tube assembly in an assembled state.
Figure 19:
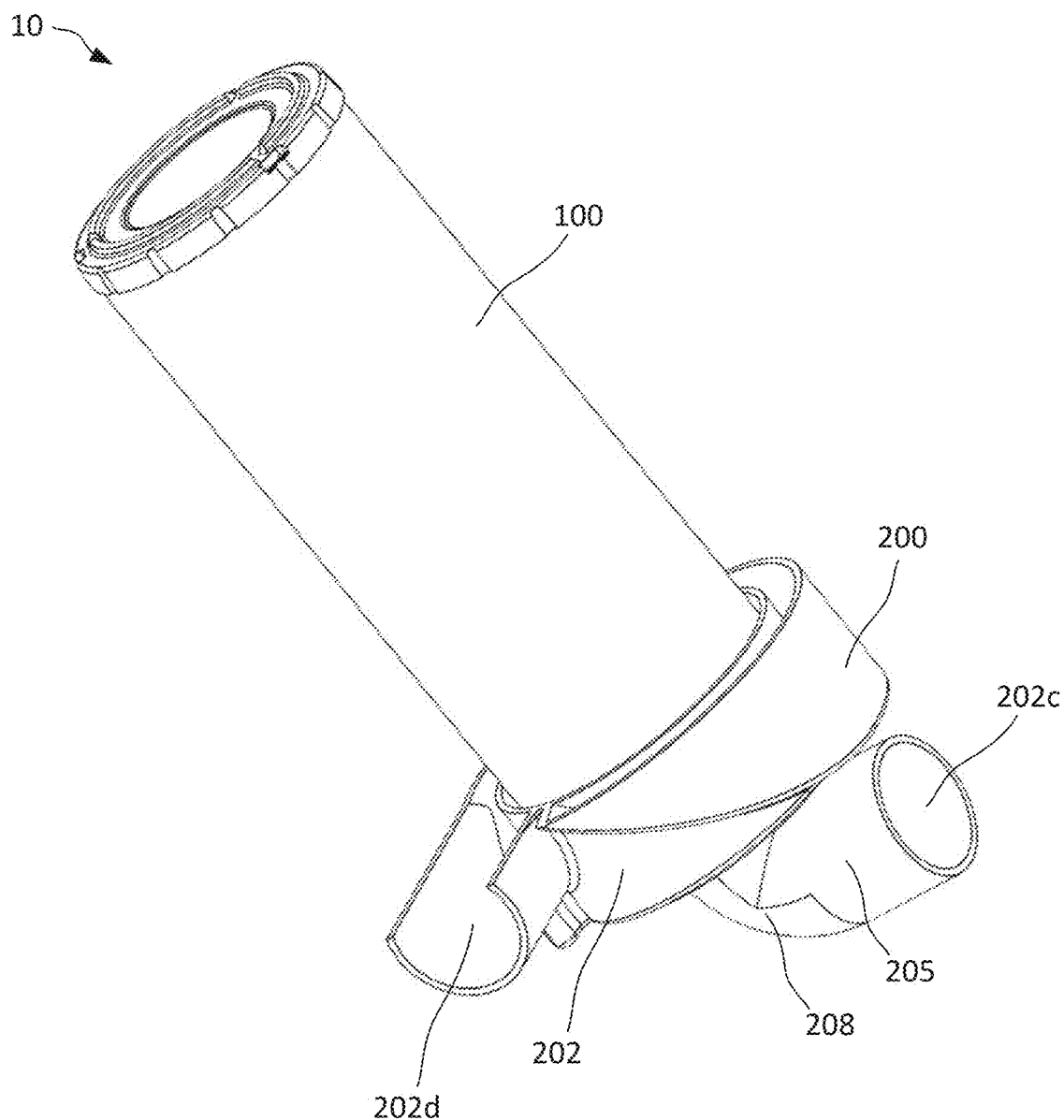
FIG. 19 is a schematic view of an example of an air cleaner assembly, with an outlet tube assembly, having features in accordance with the present disclosure.
Figure 20:
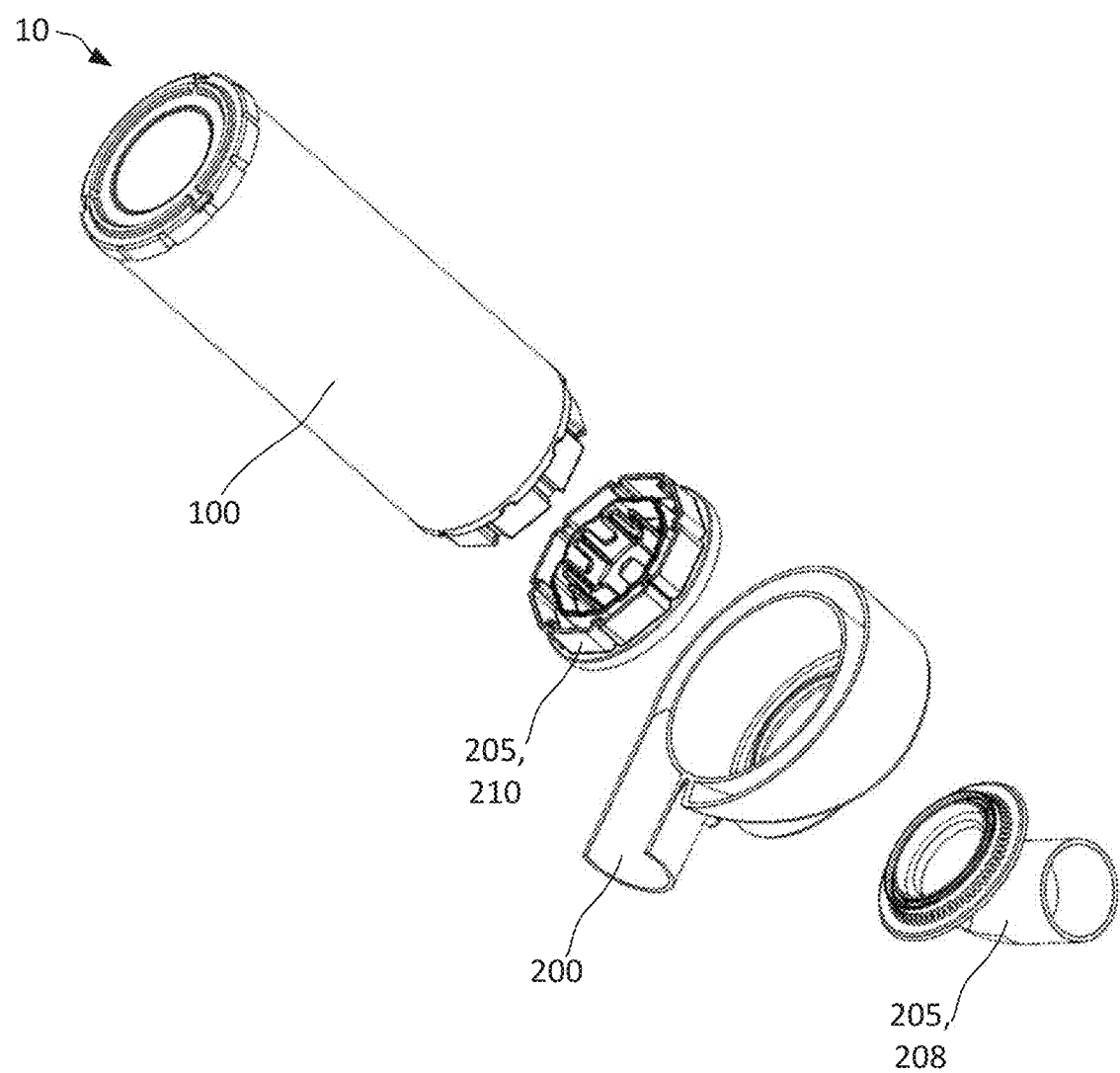
FIG. 20 is a perspective exploded view of the air cleaner assembly shown in FIG. 19.
Figure 21:
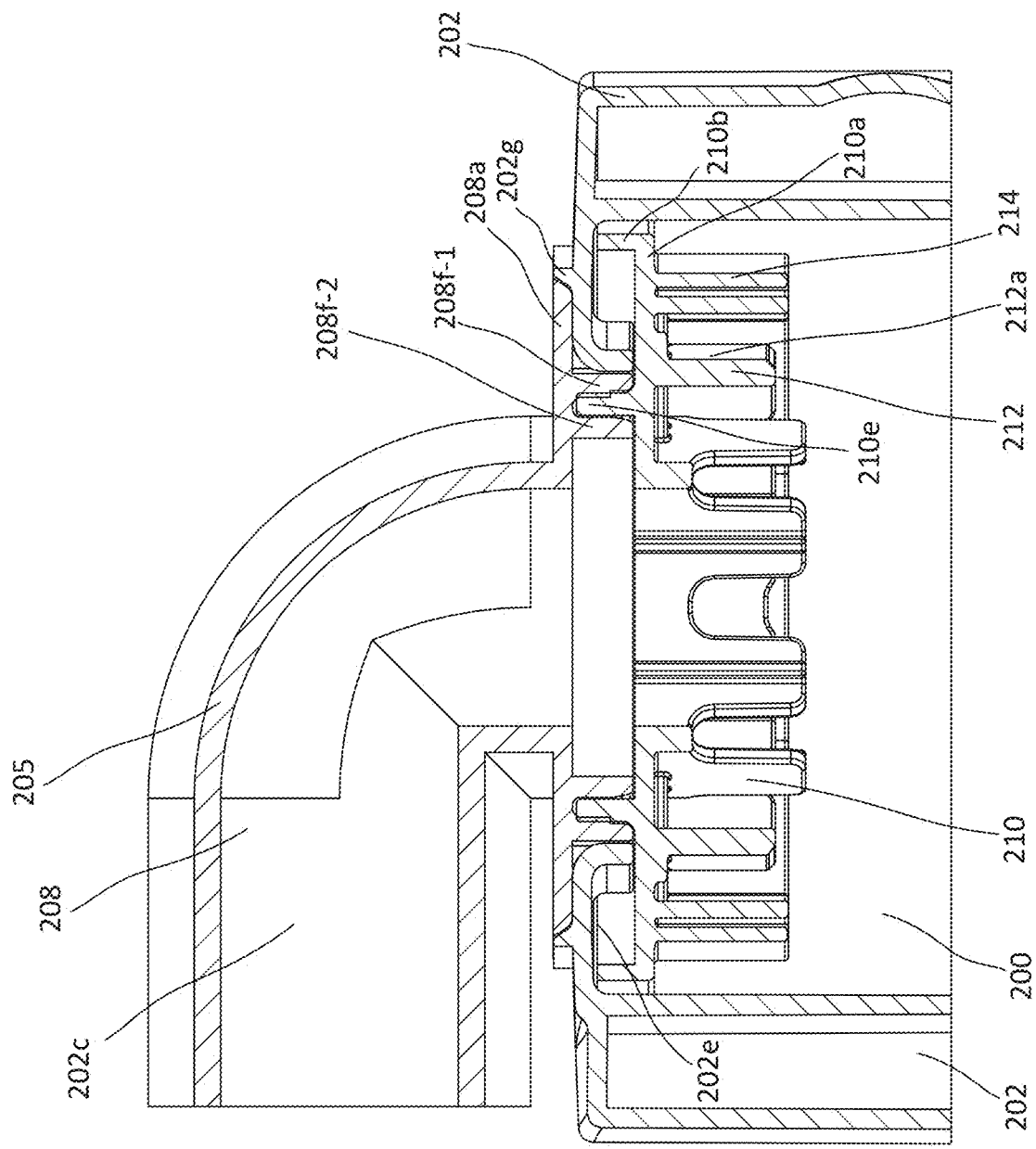
FIG. 21 is an enlarged portion of the cross-sectional side view presented in FIG. 20 with the filter cartridges removed from the air cleaner assembly.
Figure 22:
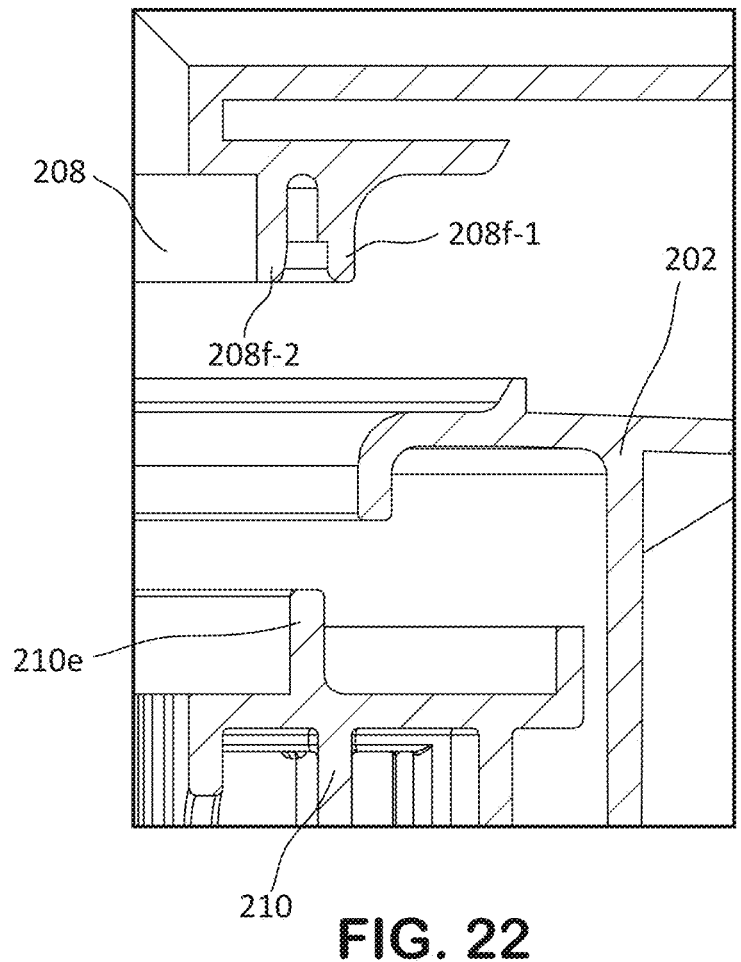
FIG. 22 is an enlarged portion of the view provided at FIG. 21 with the outlet tube assembly components shown in a detached state.
Figure 23:
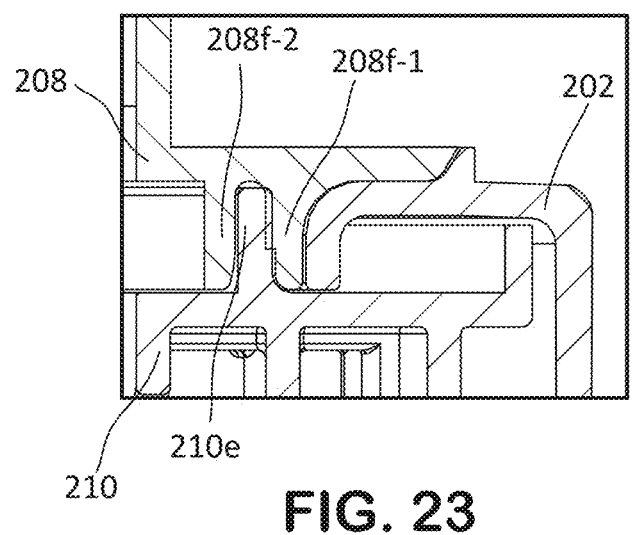
FIG. 23 is an enlarged portion of the view provided at FIG. 21.
Figure 24:
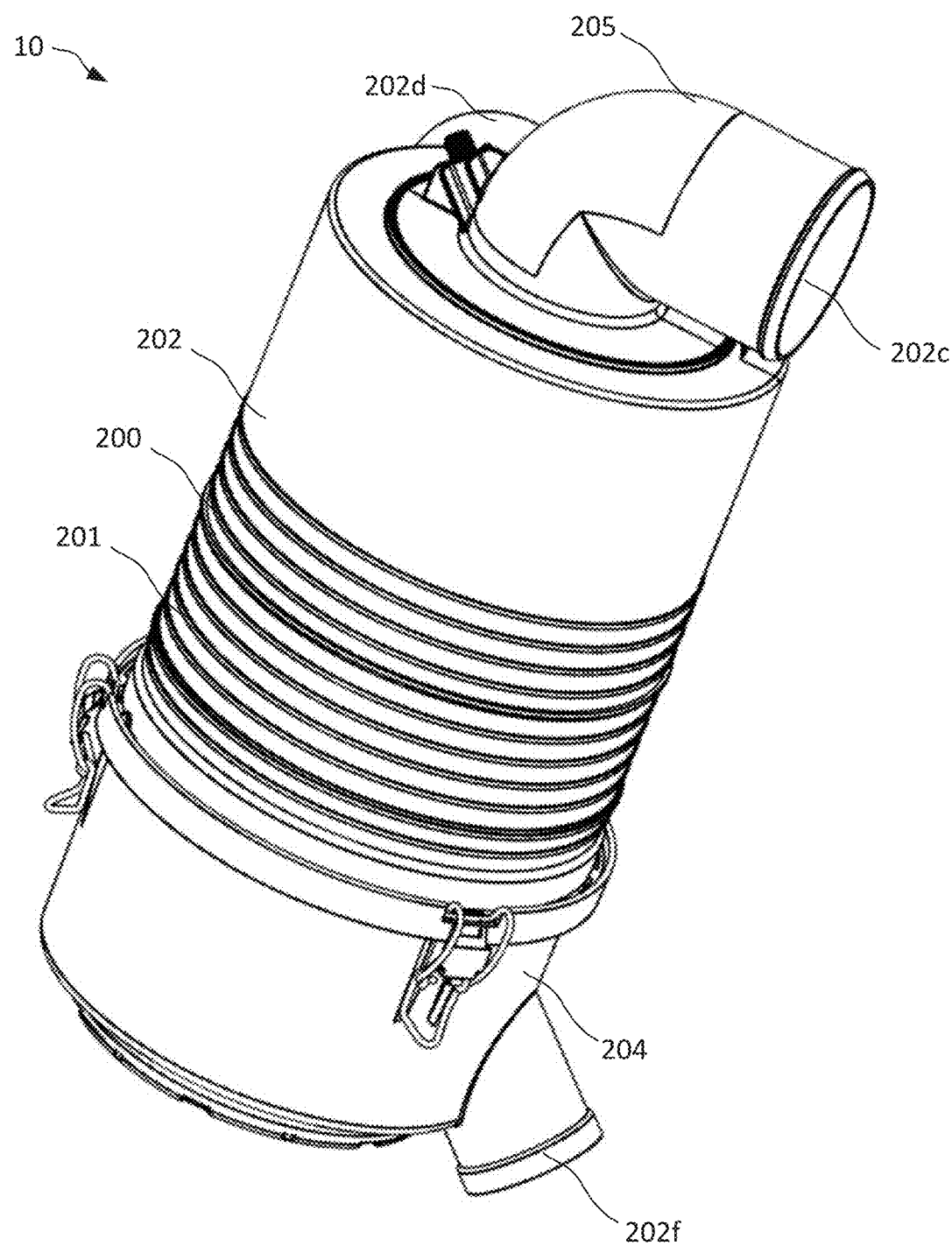
FIG. 24 is a schematic view of an example of an air cleaner assembly, with an outlet tube assembly, having features in accordance with the present disclosure.

FIGS. 15 and 16 schematically illustrate a spin welding apparatus 300 used to join the first and second parts 208, 210 together and onto a housing main body 202. As shown, the first part 208 and the main housing body 202 are fixed against rotation by a portion 302 of the apparatus and the second part 210 is fixtured to a portion 304 of the apparatus that rotates the second part 210 while moving the second part 210 axially towards the first part 208 and main housing body 202. FIG. 15 shows the main body housing 202 and first part 208 in a fixed position and the second part 210 mounted to the apparatus 300, but before being joined to the first part 208. FIG. 16 shows the main housing body 202, first part 208, and second part 210 after the joining process has been completed by the apparatus 300. FIGS. 17 and 18 show an alternative configuration for apparatus 300 in which the main housing body 202 and the second part 210 are fixed against rotation, for example, by portions 302a, 302b of the apparatus 300 while portion 304 of the apparatus 300 axially displaces and rotates the first part 208 relative to the second part 210 and main housing body 202. In one example, the apparatus 300 is configured to automatically stop axial displacement when the second part 210 is 0.5 millimeters from the interior surface 202b-3 of the housing end wall 202b to ensure sufficient clearance exists for the resulting assembly to be rotatable with respect to the housing body 202. FIG. 17 shows the apparatus 300 before the joining process while FIG. 18 shows the apparatus after the joining process. Other configurations are possible. For example, an apparatus configuration can be used in which the main housing body 202 is fixtured for rotation along with the first or second part 208, 210 and the other of the first and second parts 208, 210 is held in a fixed position by the apparatus 300. In some examples, the apparatus 300 is configured to rotate the rotating part at an rpm of between about 100 and 1000 rpm and to apply an initial axial pressure between the parts during the rotation process between about 25 and 150 pounds per square inch (psi). In some examples, the apparatus 300 is configured to hold the parts 208, 210 together in a holding or cooling phase after the rotating and joining step is completed, during which the parts 208, 210 are held together at a pressure of between 200 and 800 psi. In some examples, the first and second parts 208, 210 and the main housing body 202 are formed from a polymeric material such as polypropylene, including a polypropylene material including glass fibers, such as 20 percent glass fibers. Other materials are possible, such as polyethylene materials, polyolefin materials, acrylonitrile butadiene styrene (ABS), and non-plastic materials such as metal materials. In one example, the first and second housing parts are formed by polypropylene while the housing is formed from a metal material.

The above-outlined joining process and component features advantageously allow for modularity of parts in that different second parts 210 may be used with the same air cleaner housing and first part 208 without requiring modification thereof. Such a construction also better supports the second part 210 and related sealing surfaces against moment forces exerted on the outlet tube first part 208 in contrast to outlet tubes constructed as a single component in which forces exerted on the exterior of the outlet tube can cause the seal surfaces to undesirably rotate and compromise the seal between the outlet tube and the filter cartridge. As the parts 208 and 210 are joined together with a fused or welded attachment, the potential for undesirable leakage is also minimized. Further, providing the wall structures 208 and 210 in separate parts can allow for manufacturing efficiencies, such as by improving moldability of the parts. Another advantage with the disclosed configurations is that the outlet tube assembly 205 can be rotated to any position in the 360-degree range which allows for modularity in that the assembly can be used in different spaces that require different outlet tube orientations. Yet another advantage is that the clamped joining of the first and second parts 208, 210 can work with a variety of housing materials (e.g., metal, plastic, cardboard, etc.).

Many different configurations of the first and second parts 208, 210 are possible. The below additional examples are presented to demonstrate, in part, that different joining interfaces and sealing arrangements for variously configured filter cartridges can be provided. It is noted that the above-provided description for the example shown at FIGS. 1 to 18 is generally applicable to the examples provided below as many common and overlapping features exist among the examples. Accordingly, where such similarities exist, the descriptions need not be repeated again below. Rather, the descriptions for the examples described below will primarily focus on the differences among the embodiments.

Example of FIGS. 19 to 23

Referring to FIGS. 19 to 23, an example configuration is presented that is generally similar to the configuration illustrated at FIGS. 1 to 18 and is provided with a second part 210 that is configured to receive filter cartridges 100, 150 having generally polygonal shaped seal surfaces. However, as most easily viewed at FIGS. 21 to 23, the first and second parts of the example shown at FIGS. 19 to 23 are configured with a different interface arrangement in comparison to the example shown at FIGS. 1 to 18. For example, the main housing body 202 defines a single circumferential wall structure 202g that abuts and end of the flange 208a rather than defining a groove. Further, the second part 210 defines an axially extending wall 210b that extends axially towards the interior side of the main housing body 202. The weld joint is also provided with a different configuration in that the first part 208 is provided with a pair of circumferential wall structures 208f-1 and 208f-2 that together form a groove for receiving a single circumferential wall structure 210e of the second part 210. As most easily seen at FIG. 22, the groove between the wall structures 208f-1 and 208f-2 has generally straight sides with an internal step while the wall structure 210e has a generally rectangular construction. With such an arrangement, the resulting welded or fused joint between these components can be characterized as forming a flanged shear joint.

Example of FIGS. 24 to 35

Referring to FIGS. 24 to 35, an example configuration is presented that is generally similar to the configuration illustrated at FIGS. 1 to 18. In this example, the second part 210 is configured to receive a filter cartridge having a different sealing arrangement while the first and second parts 208, 210 are also configured with a different interface arrangement. For example, and as most easily seen at FIGS. 27 to 29, the main housing body 202 is provided with circumferential wall structures 202g and 202f that extend axially towards the second part 210 rather than towards the first part 208. The second part 210 is formed with an additional circumferential wall structure 210j that is received within the groove or recess 202h defined between the wall structures 210g, 210f. Further, the wall structure 202f is received within a gap or recess 210k defined between the wall structures 210e and 210j. With such an arrangement, the cooperating wall structures and grooves function as a guide and support structure when rotating the outlet tube assembly 205 with respect to the housing. This arrangement can be advantageous in that the sliding interface defined by these components is provided within the interior volume of the air cleaner housing 200 and is thus more protected from ingress of contaminants. The outlet 208 is also configured without the extensions 208b, 208d shown in the first example and is instead provided with a flange wall 208a that extends radially from the wall structure 208f to a distal end 208c and defines a flat surface abutting the main housing body external surface 202b-2. As shown, the main housing body 202 is provided with a circumferential wall structure 202m that is adjacent the distal end 208c and can act as guide surface for the first part 208.

Figure 25:
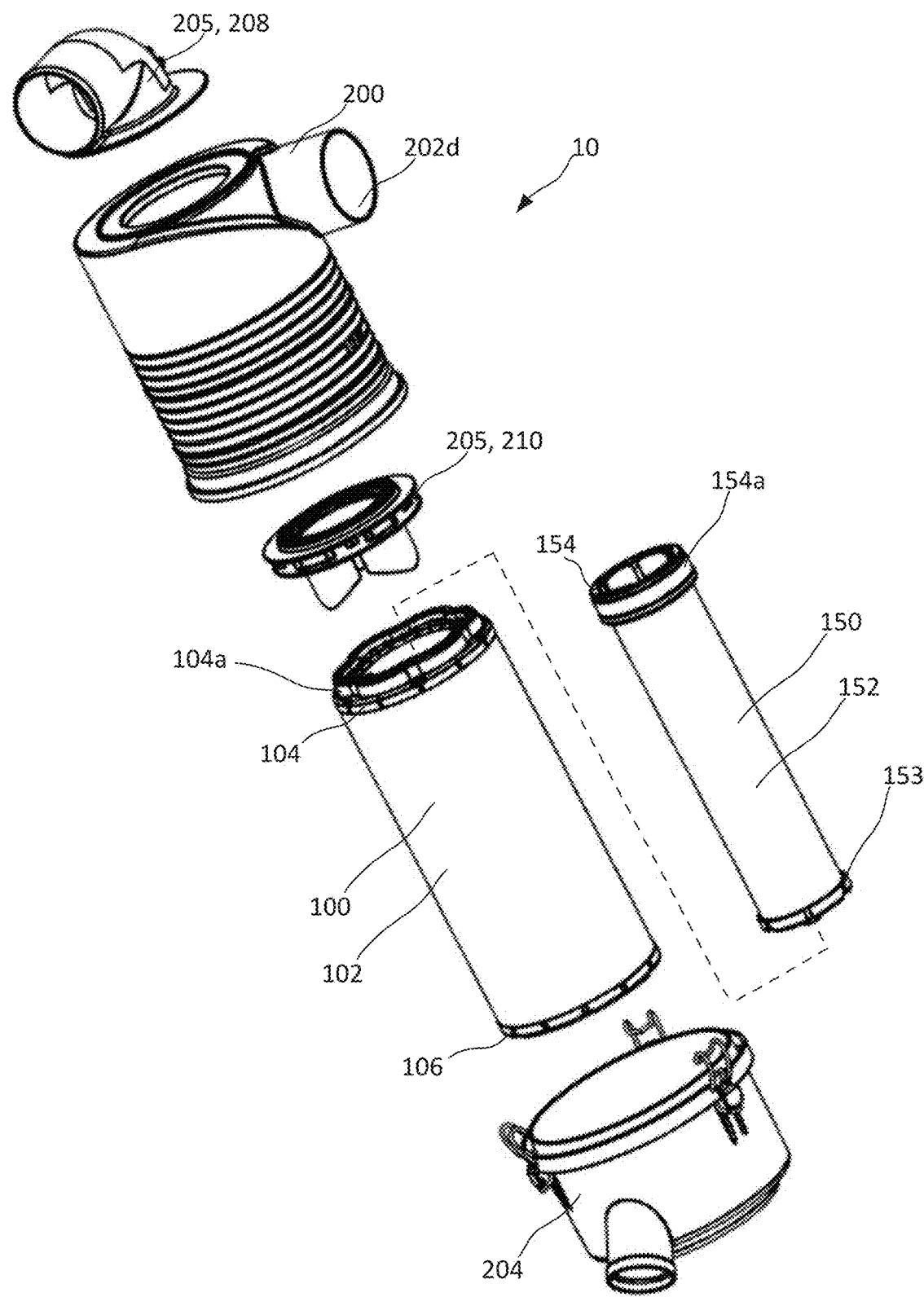
FIG. 25 is a perspective exploded view of the air cleaner assembly shown in FIG. 24.
Figure 26:
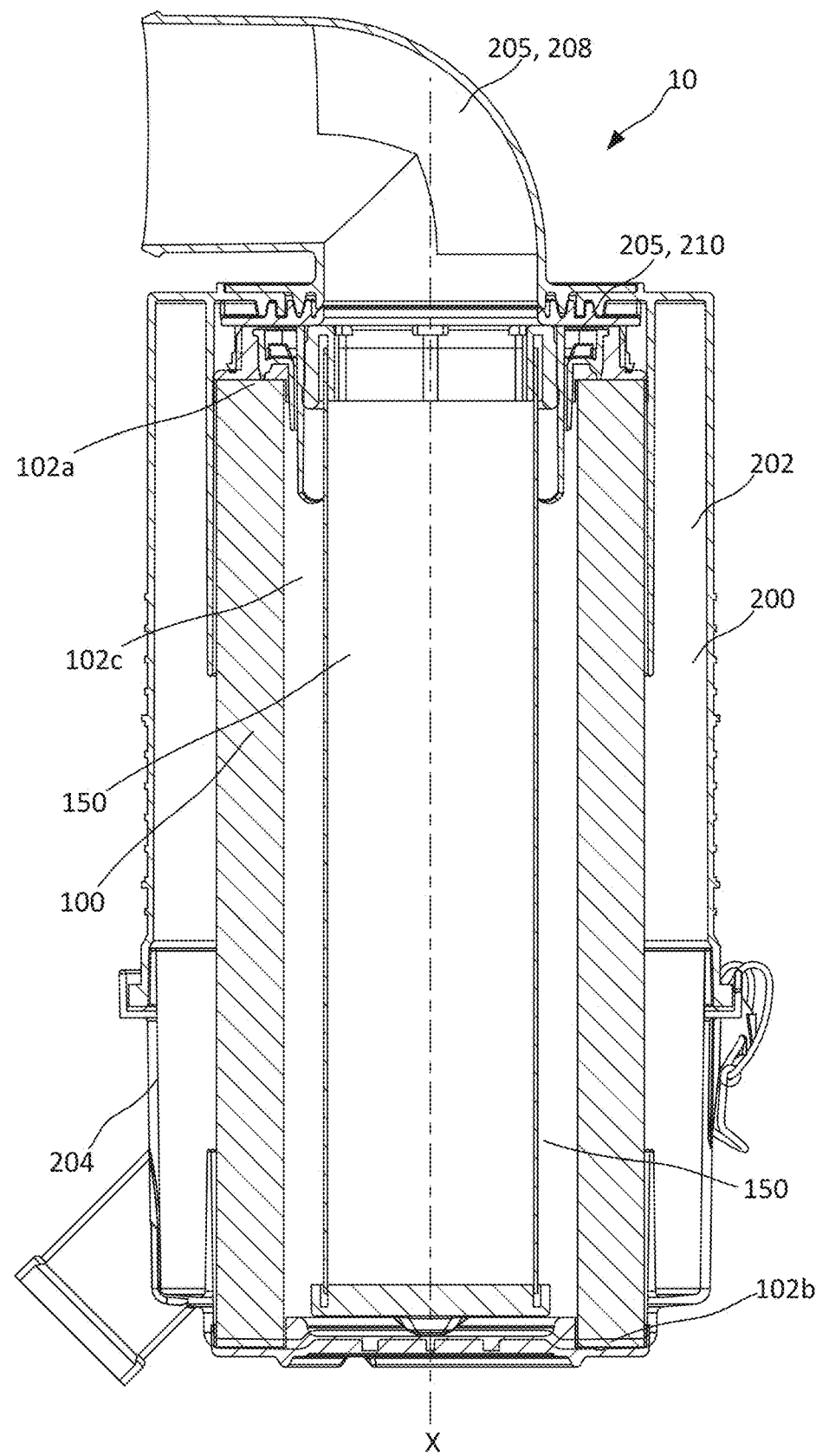
FIG. 26 is a cross-sectional side view of the air cleaner assembly shown in FIG. 24.
Figure 27:
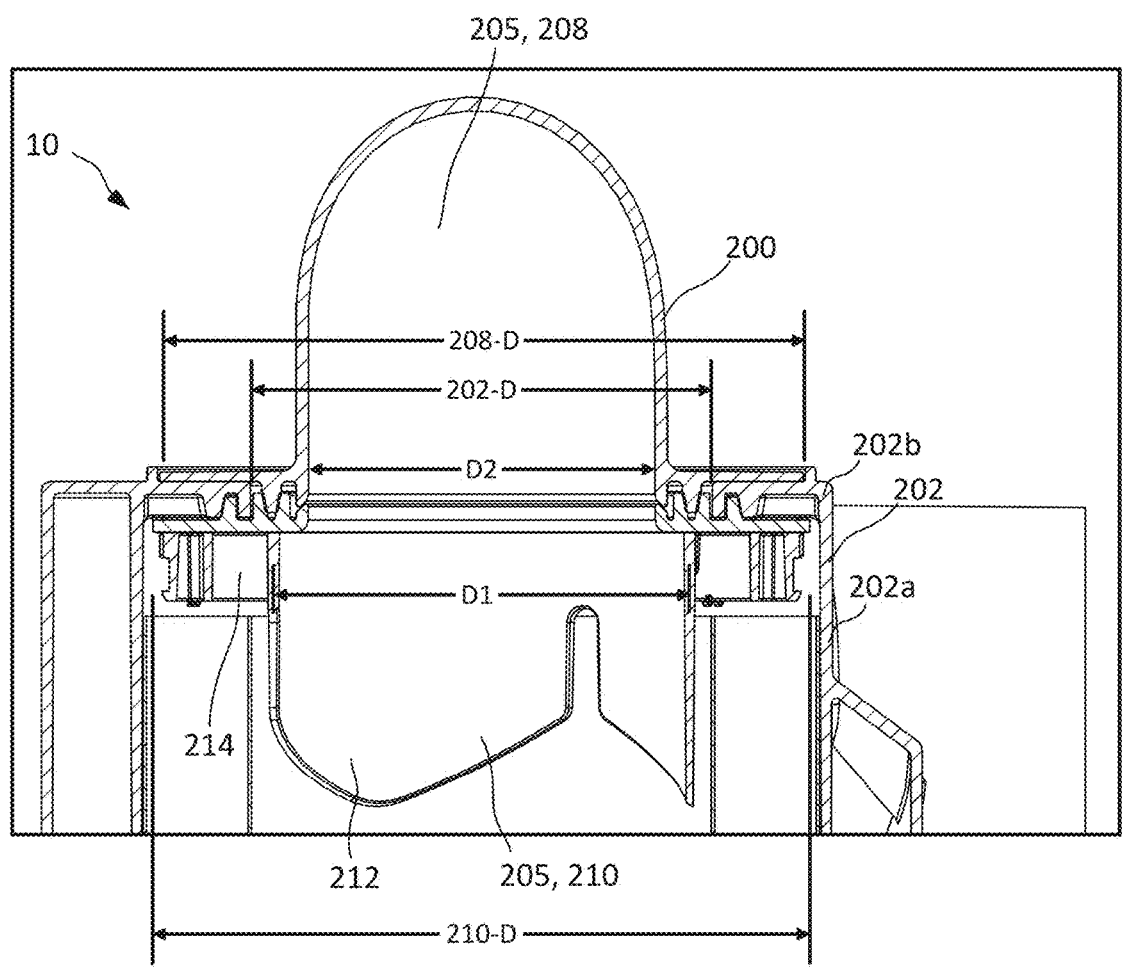
FIG. 27 is an enlarged portion of the cross-sectional side view presented in FIG. 26 with the filter cartridges removed from the air cleaner assembly.
Figure 28:
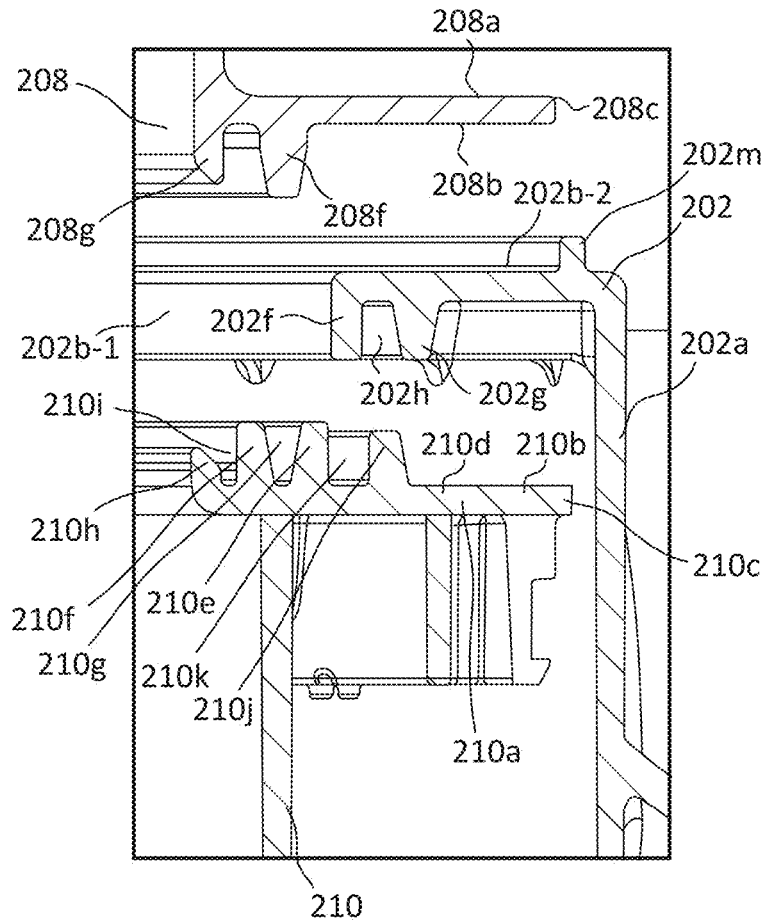
FIG. 28 is an enlarged portion of the view provided at FIG. 27 with the outlet tube assembly components shown in a detached state.
Figure 29:
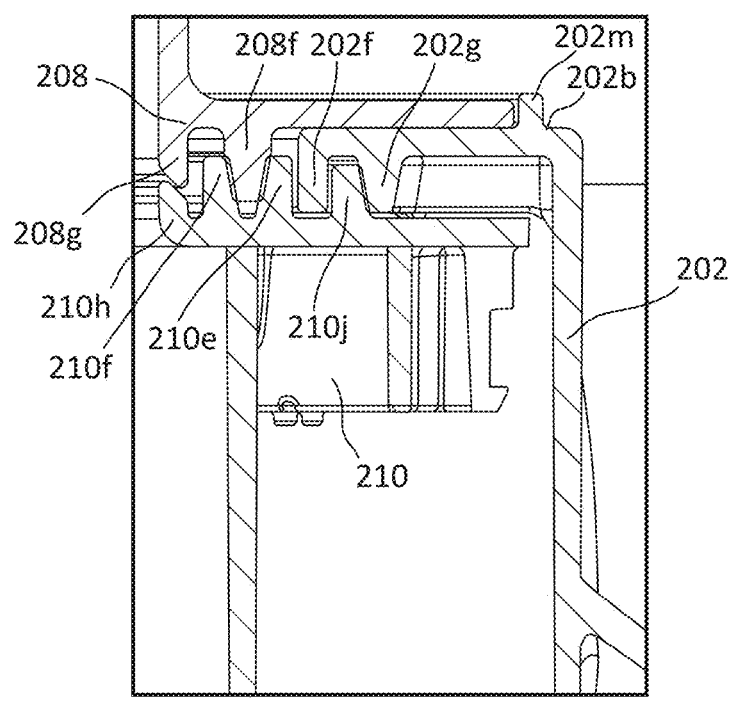
FIG. 29 is an enlarged portion of the view provided at FIG. 27.
Figure 30:
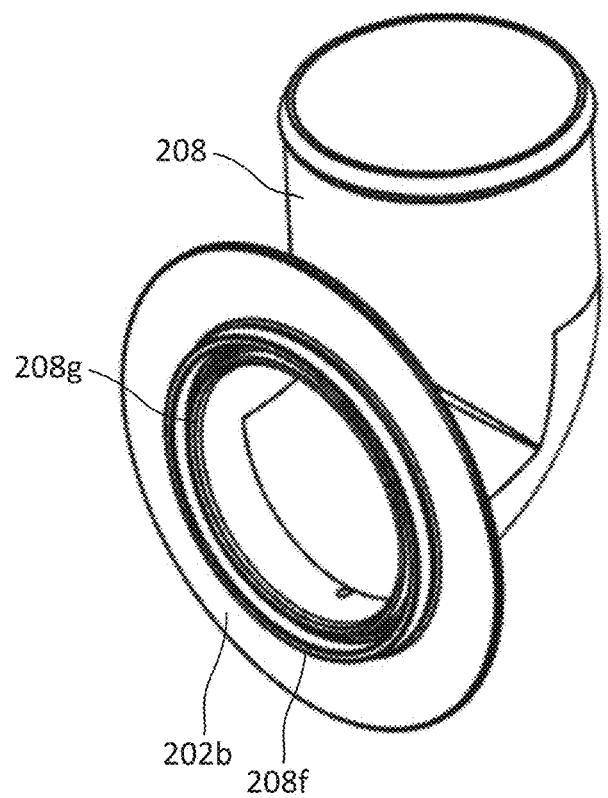
FIG. 30 is a perspective view of a first part of the outlet tube assembly shown in FIG. 24.
Figure 31:
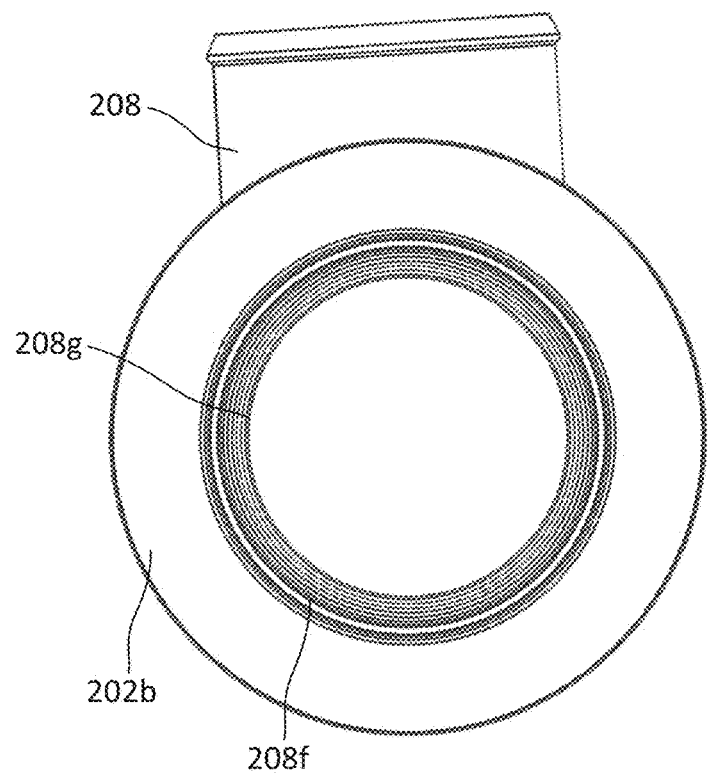
FIG. 31 is an end view of the first part shown in FIG. 30.
Figure 32:
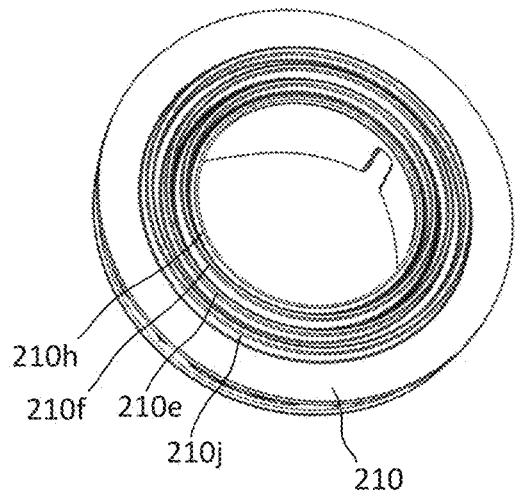
FIG. 32 is a first perspective view of a second part of the outlet tube assembly shown in FIG. 24.
Figure 33:
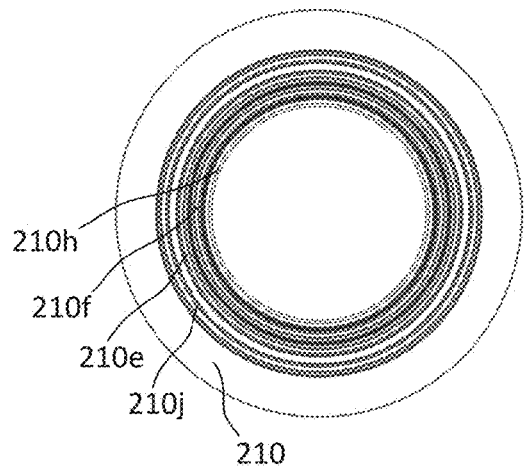
FIG. 33 is a first end view of the second part shown in FIG. 32.
Figure 34:
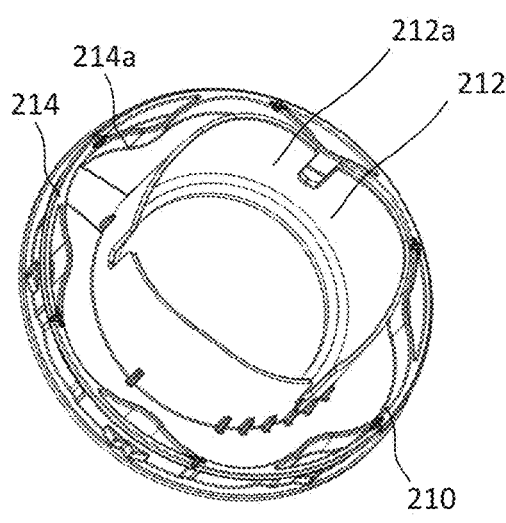
FIG. 34 is a second perspective view of the second part shown in FIG. 32.
Figure 35:
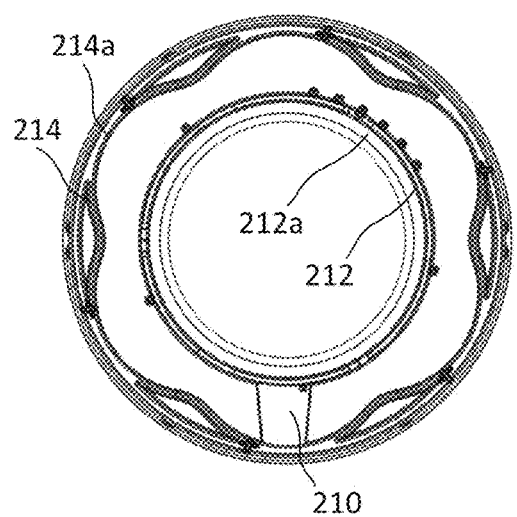
FIG. 35 is a second end view of the second part shown in FIG. 32.
Figure 36:
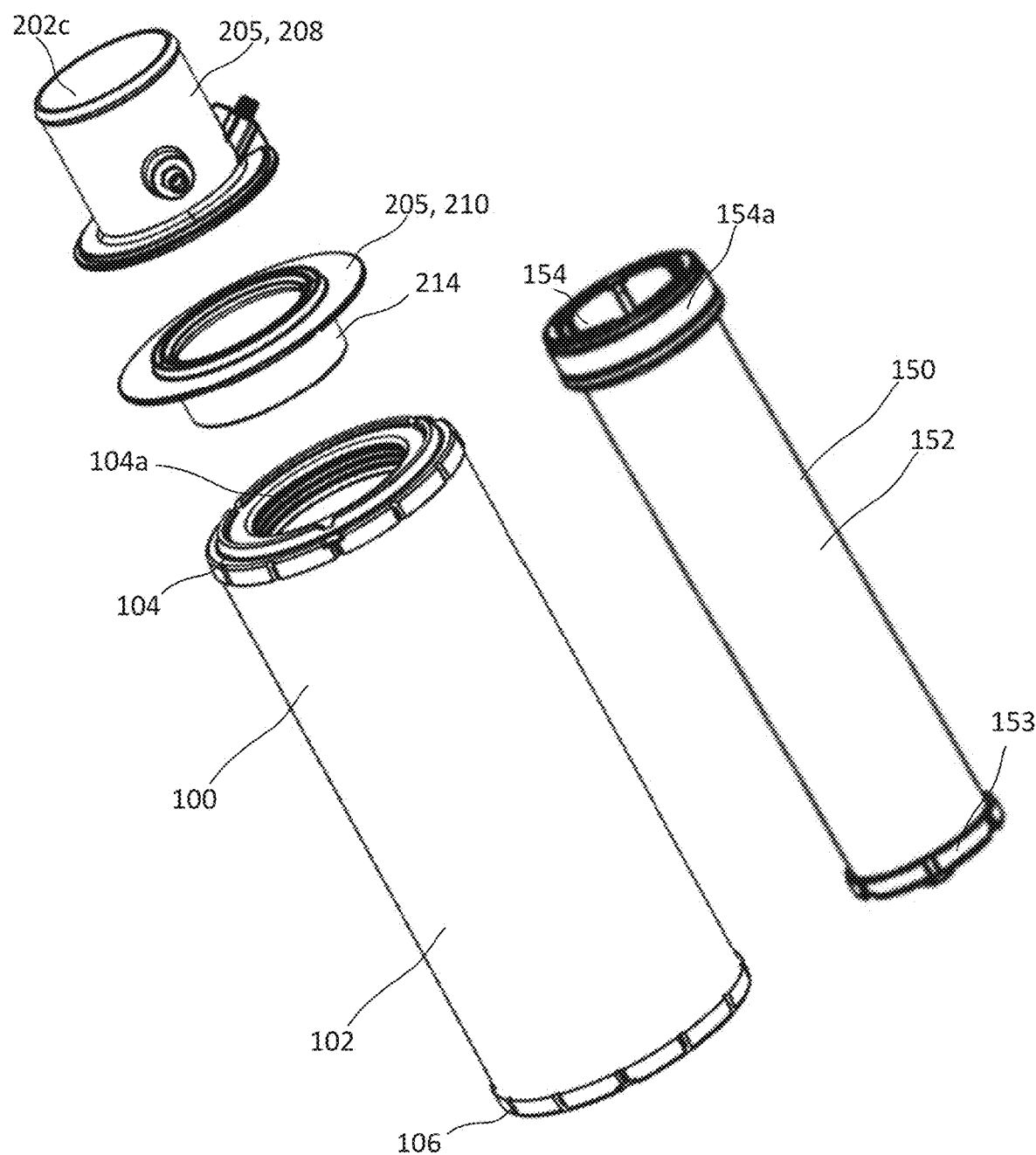
FIG. 36 is a schematic view of a first filter cartridge, a second filter cartridge, and an outlet tube assembly usable with the air cleaner shown at FIG. 24, having features in accordance with the present disclosure.
Figure 37:
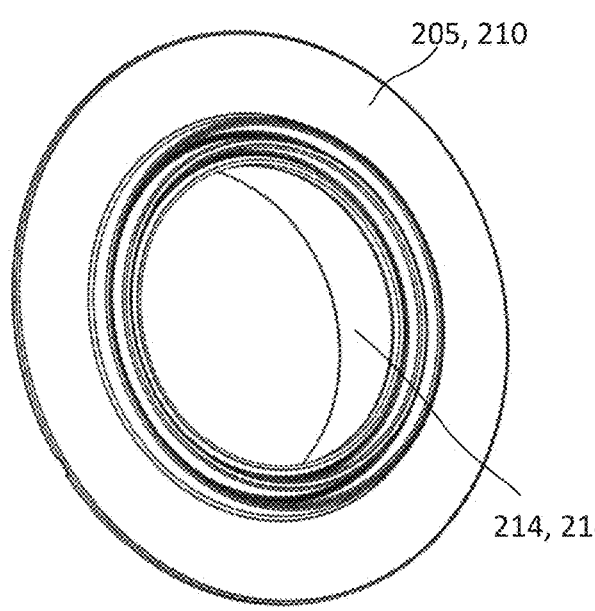
FIG. 37 is a first perspective view of a second part of the outlet tube assembly shown in FIG. 36.
Figure 38:
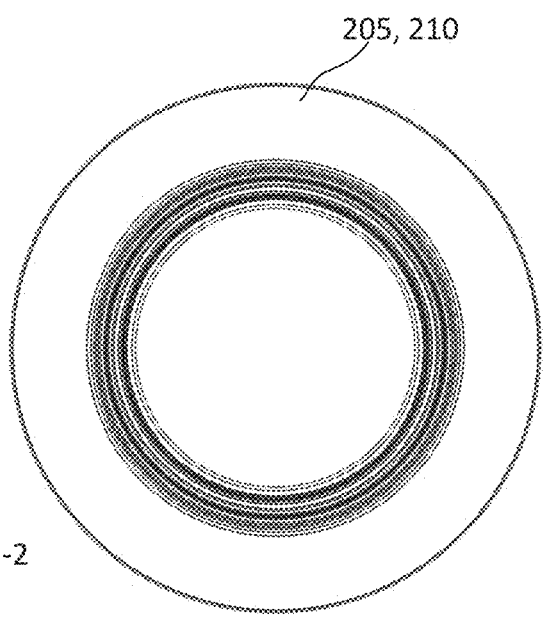
FIG. 38 is a first end view of the second part shown in FIG. 37.
Figure 39:
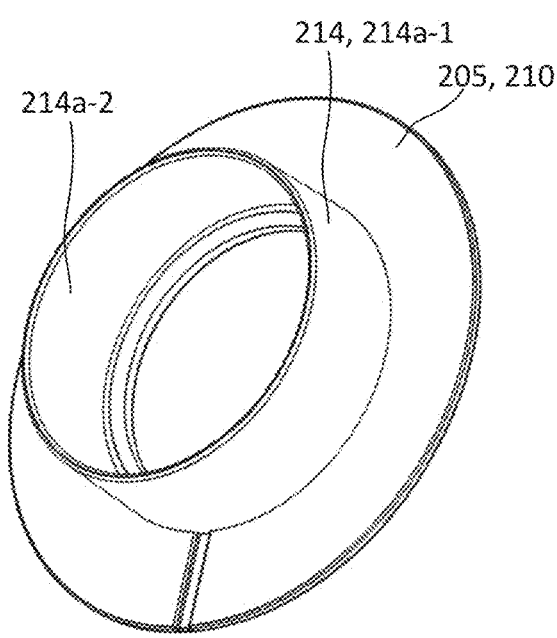
FIG. 39 is a second perspective view of the second part shown in FIG. 37.
Figure 40:
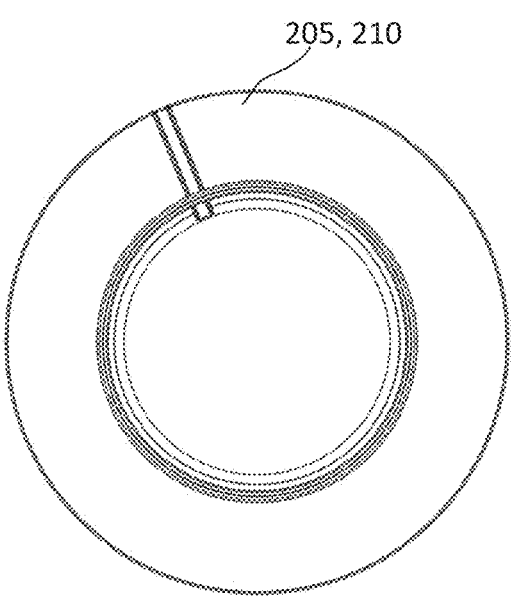
FIG. 40 is a second end view of the second part shown in FIG. 37.
Figure 41:
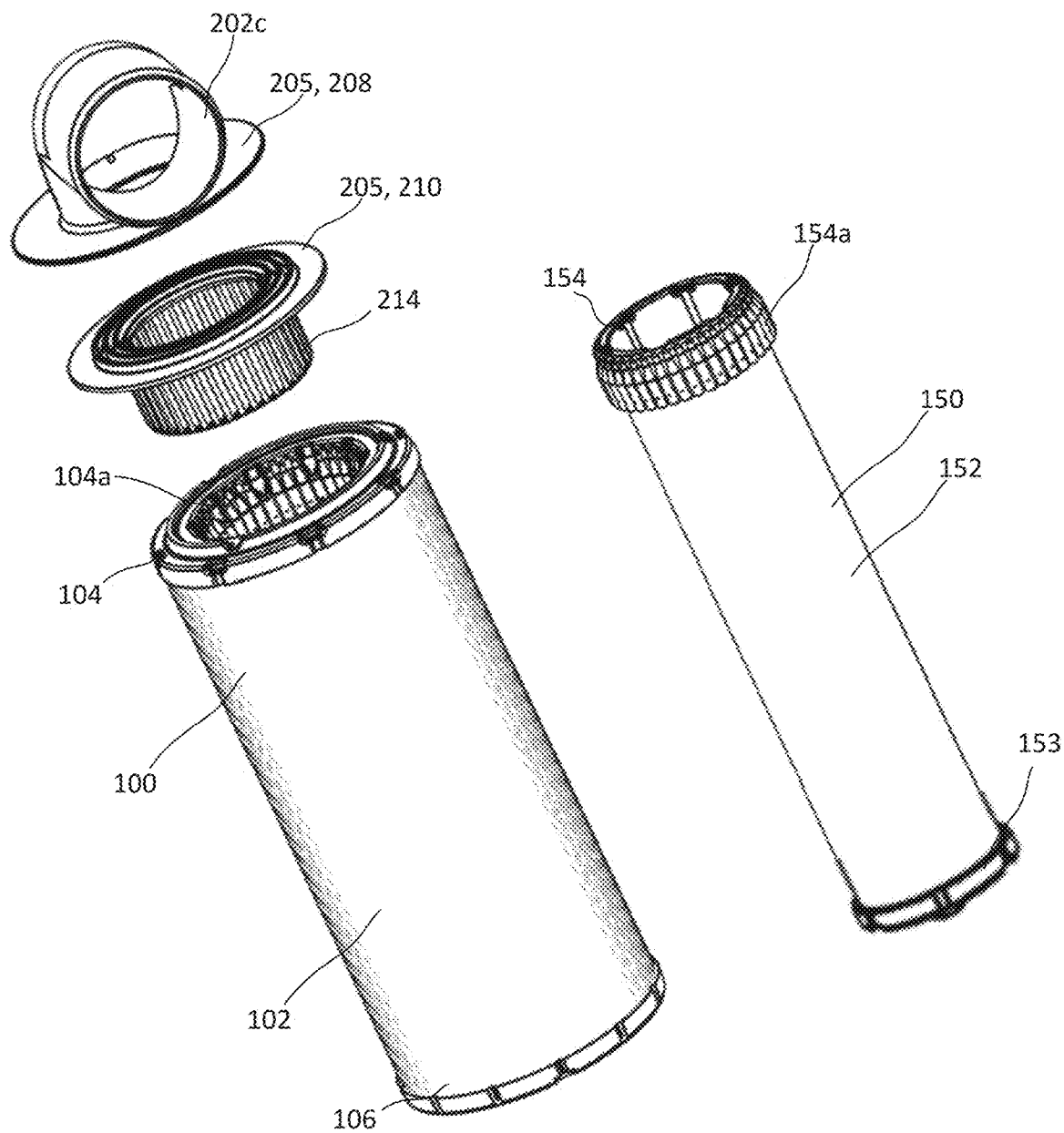
FIG. 41 is a schematic view of a first filter cartridge, a second filter cartridge, and an outlet tube assembly usable with the air cleaner shown at FIG. 24, having features in accordance with the present disclosure.
Figure 42:
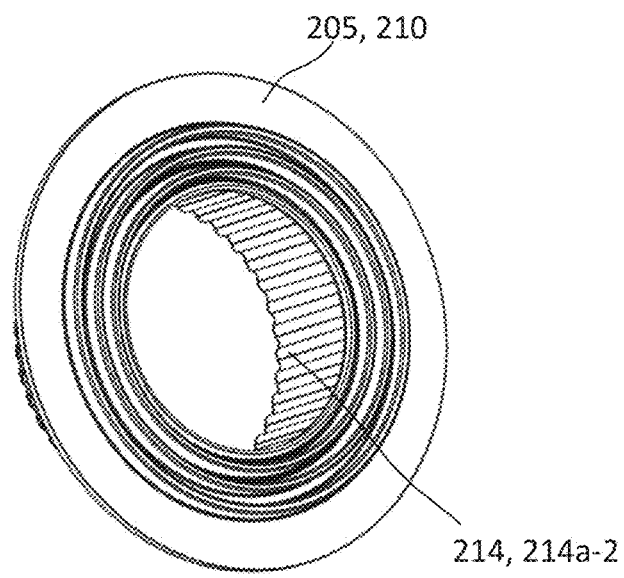
FIG. 42 is a first perspective view of a second part of the outlet tube assembly shown in FIG. 41.
Figure 43:
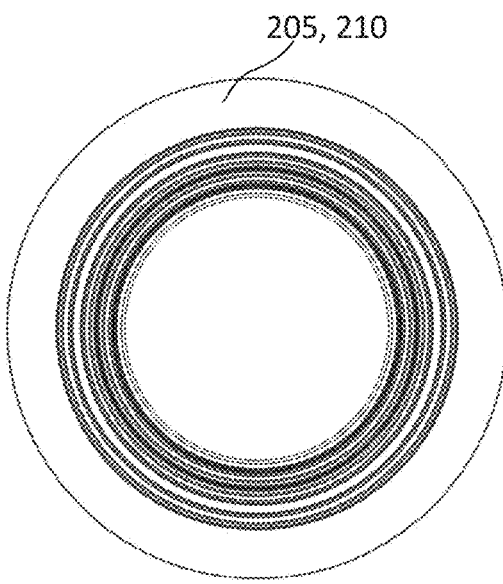
FIG. 43 is a first end view of the second part shown in FIG. 42.
Figure 44:
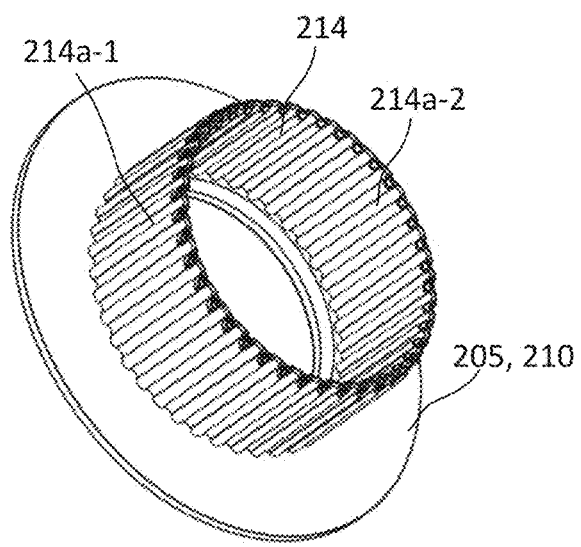
FIG. 44 is a second perspective view of the second part shown in FIG. 42.
Figure 45:
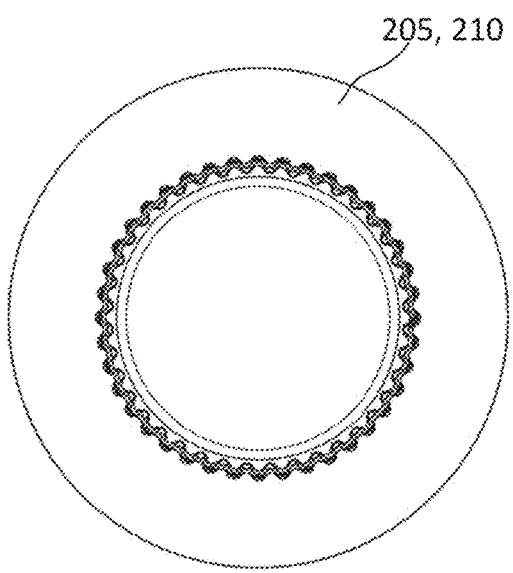
FIG. 45 is a second end view of the second part shown in FIG. 42.
Figure 46:
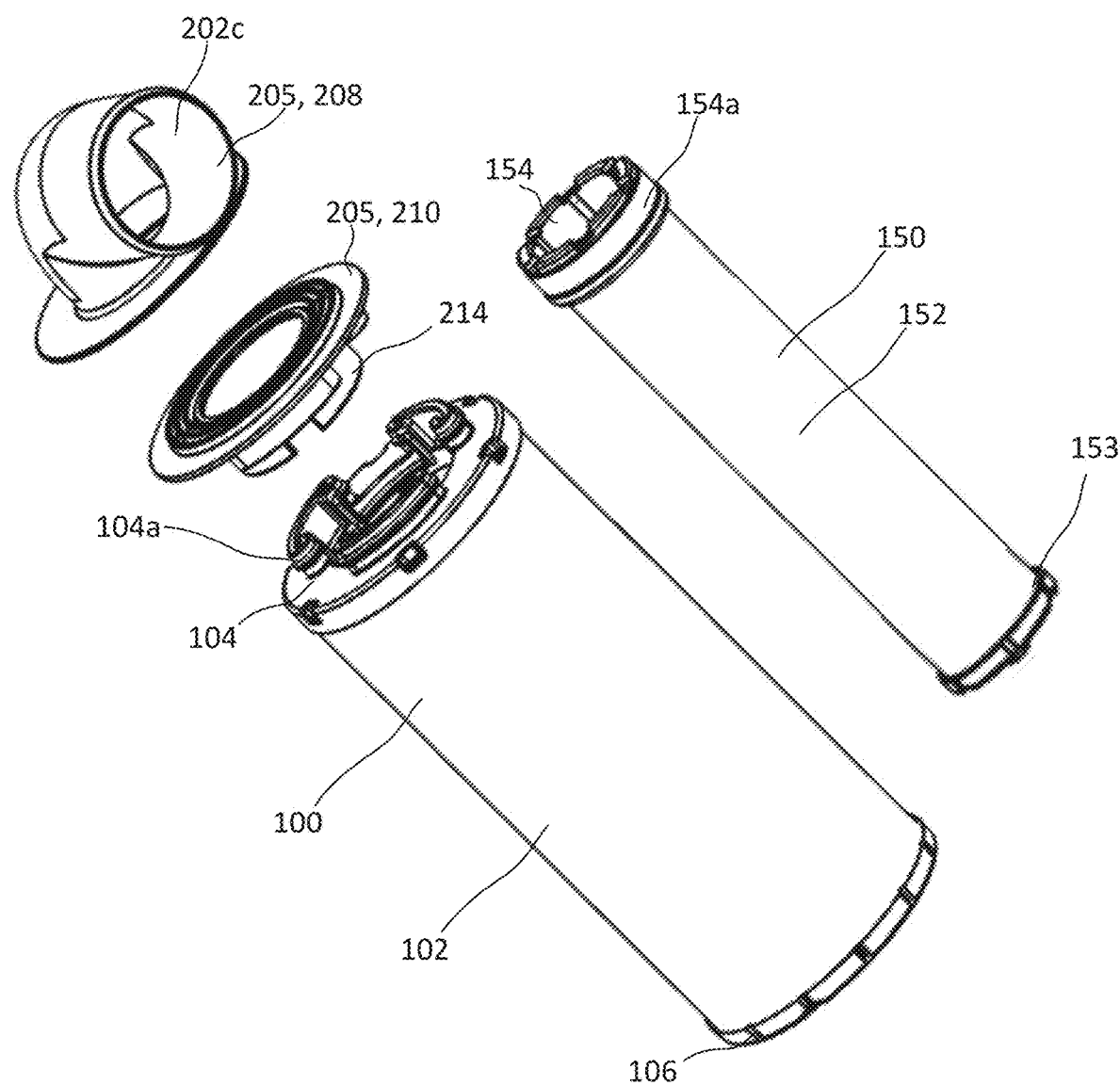
FIG. 46 is a schematic view of a first filter cartridge, a second filter cartridge, and an outlet tube assembly usable with the air cleaner shown at FIG. 24, having features in accordance with the present disclosure.
Figure 47:
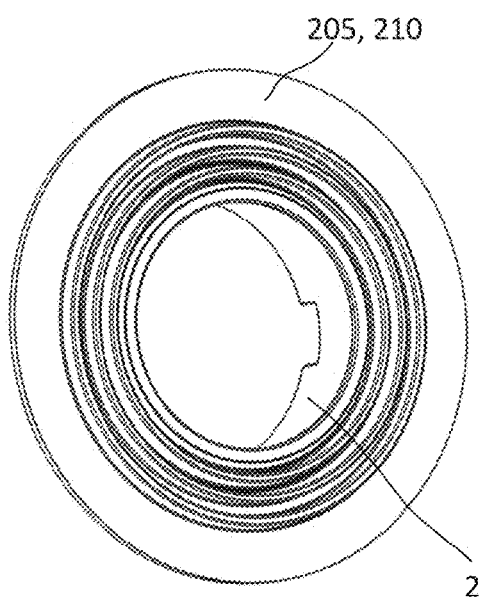
FIG. 47 is a first perspective view of a second part of the outlet tube assembly shown in FIG. 46.
Figure 48:
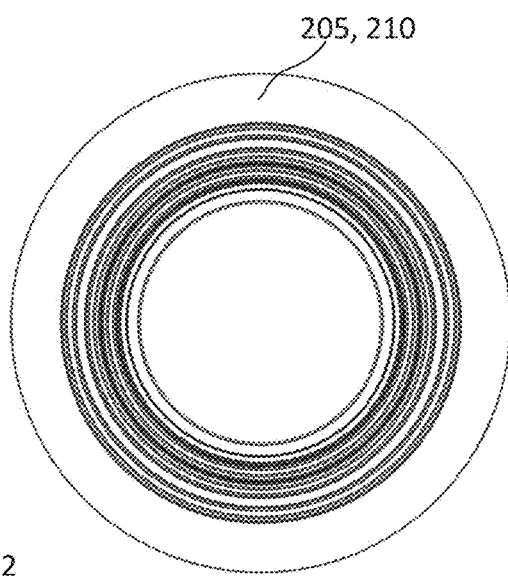
FIG. 48 is a first end view of the second part shown in FIG. 47.
Figure 49:
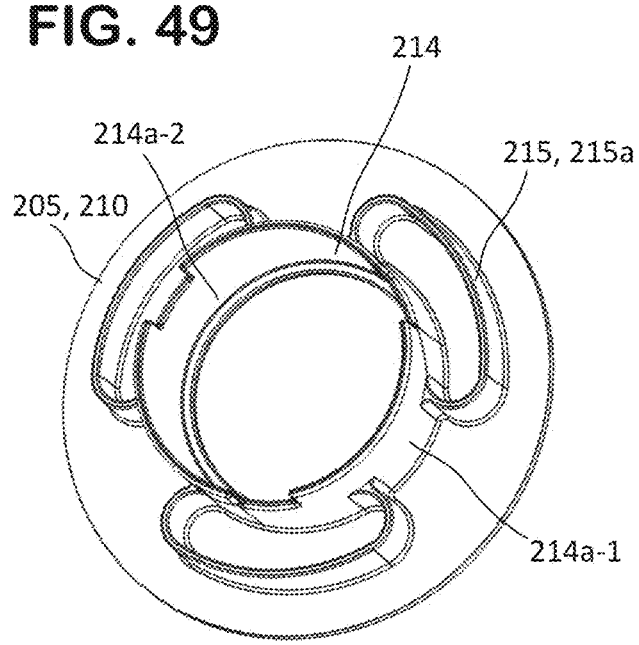
FIG. 49 is a second perspective view of the second part shown in FIG. 47.
Figure 50:
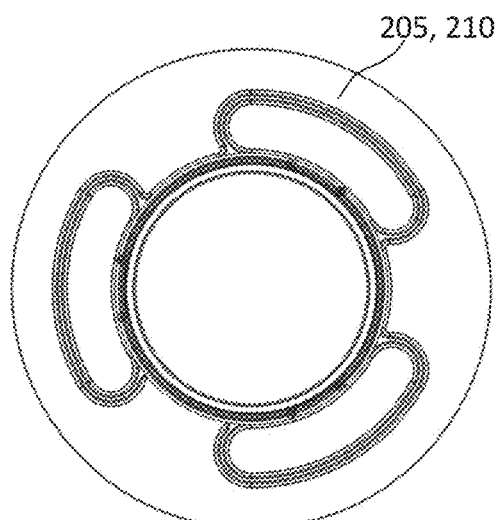
FIG. 50 is a second end view of the second part shown in FIG. 47.
Figure 51:
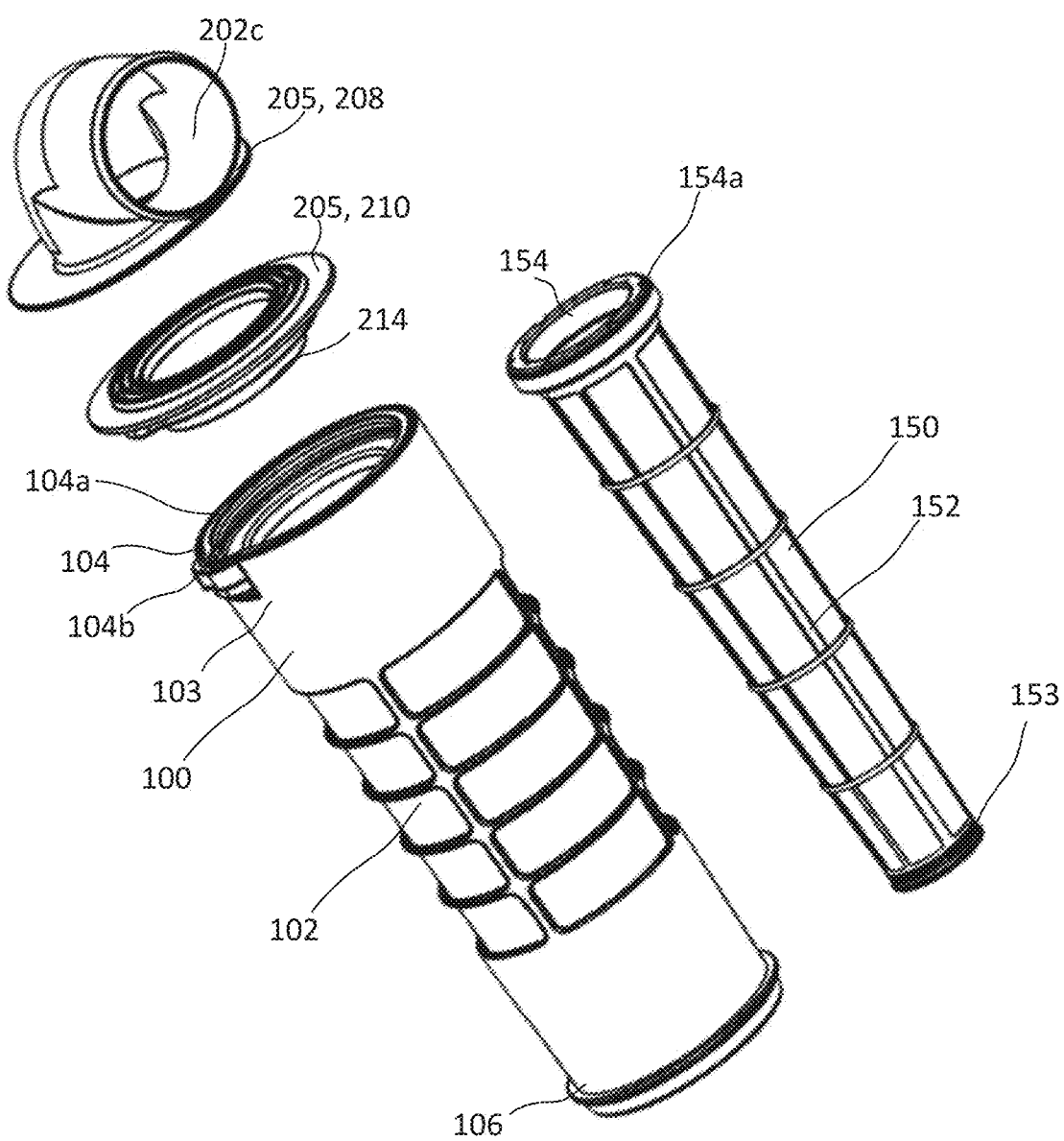
FIG. 51 is a schematic view of a first filter cartridge, a second filter cartridge, and an outlet tube assembly usable with the air cleaner shown at FIG. 24, having features in accordance with the present disclosure.
Figure 52:
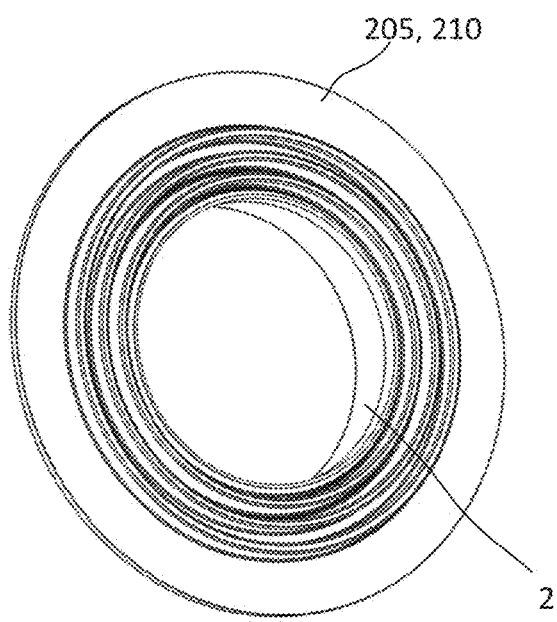
FIG. 52 is a first perspective view of a second part of the outlet tube assembly shown in FIG. 51.
Figure 53:
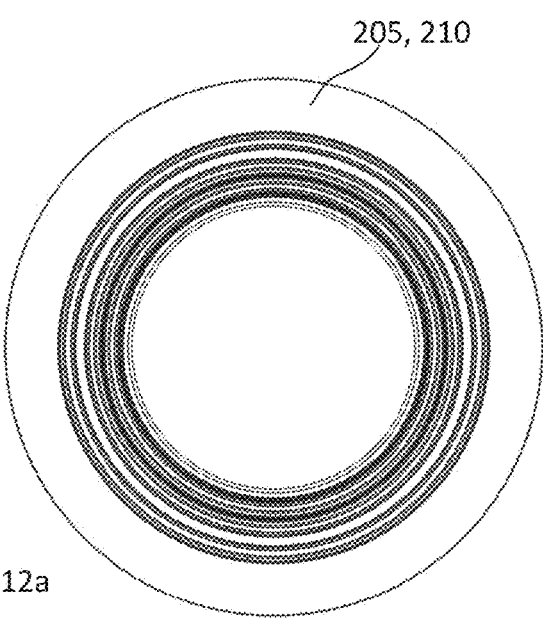
FIG. 53 is a first end view of the second part shown in FIG. 52.
Figure 54:
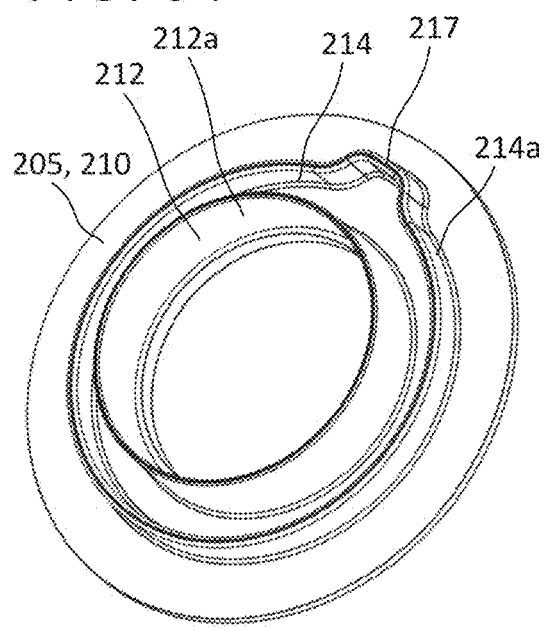
FIG. 54 is a second perspective view of the second part shown in FIG. 52.
Figure 55:
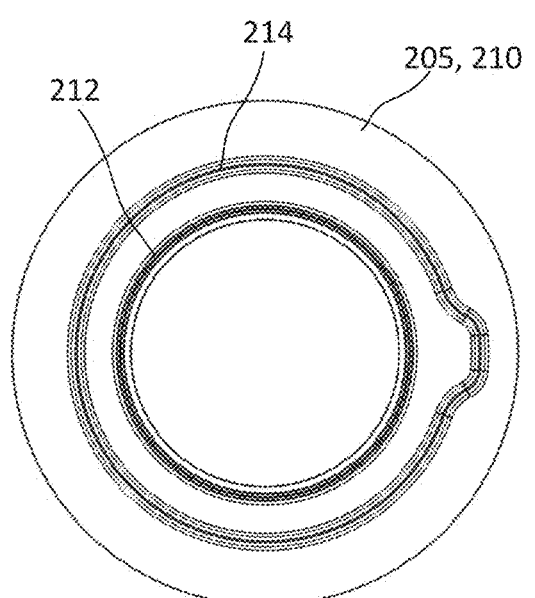
FIG. 55 is a second end view of the second part shown in FIG. 52.
Figure 56:
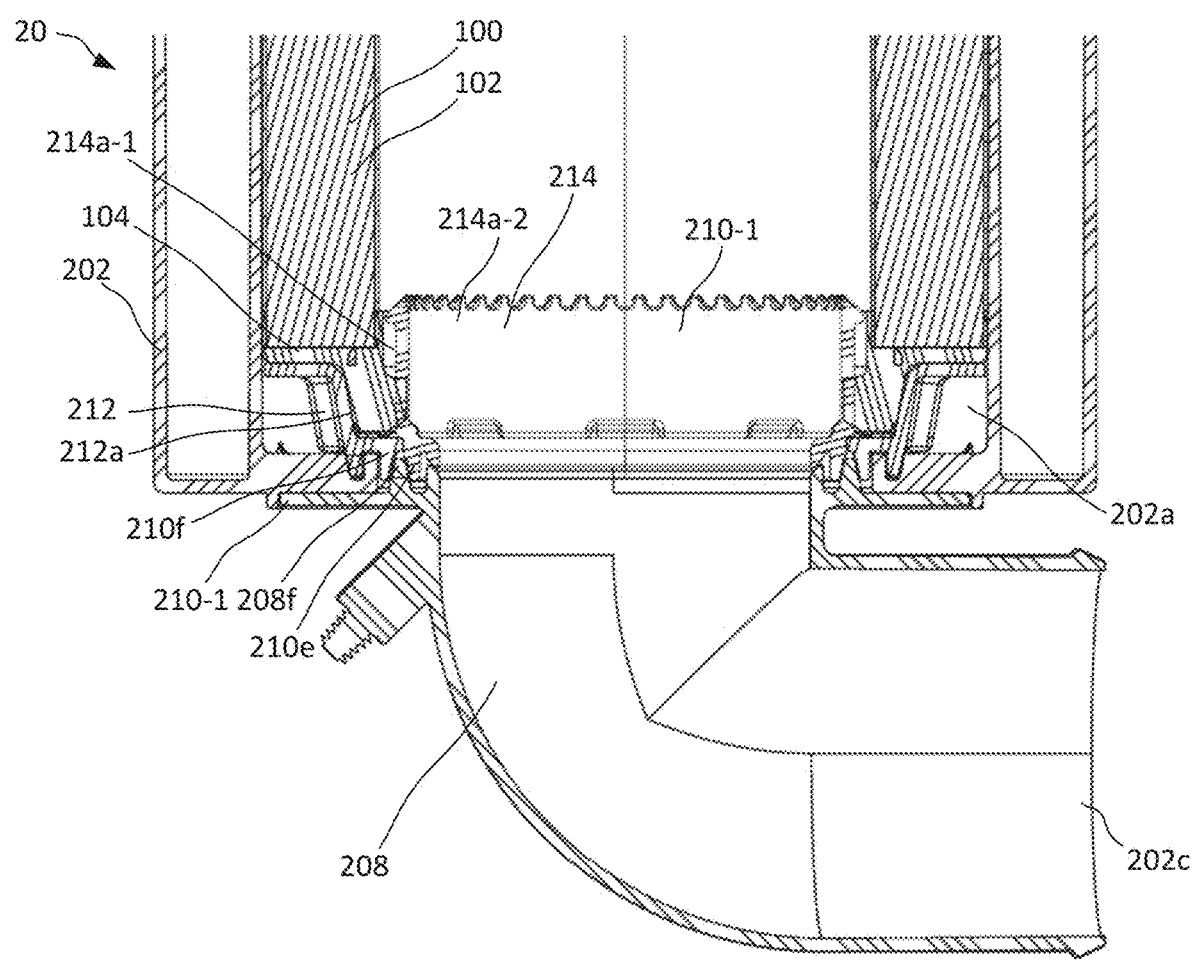
FIG. 56 is a schematic partial cross-sectional view of an example of an air cleaner assembly, with an outlet tube assembly, having features in accordance with the present disclosure.
Figure 57:
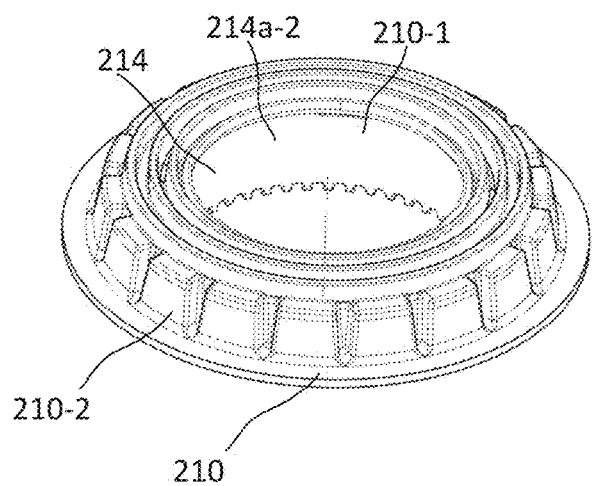
FIG. 57 is a first perspective view of a second part assembly of the outlet tube assembly shown in FIG. 56.
Figure 58:
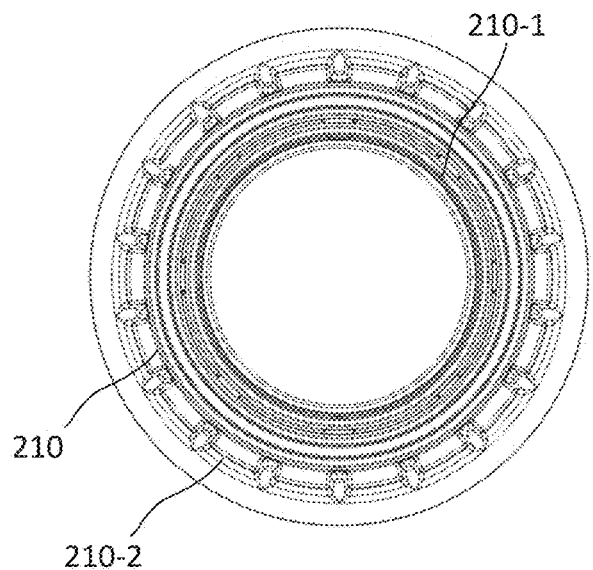
FIG. 58 is a first end view of the second part assembly shown in FIG. 57.
Figure 59:
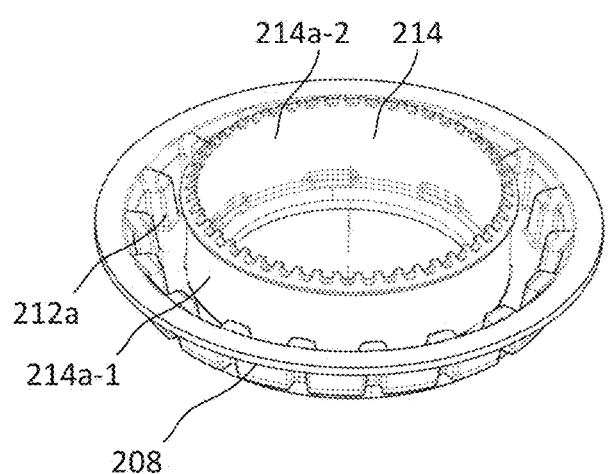
FIG. 59 is a second perspective view of the second part assembly shown in FIG. 57.
Figure 60:
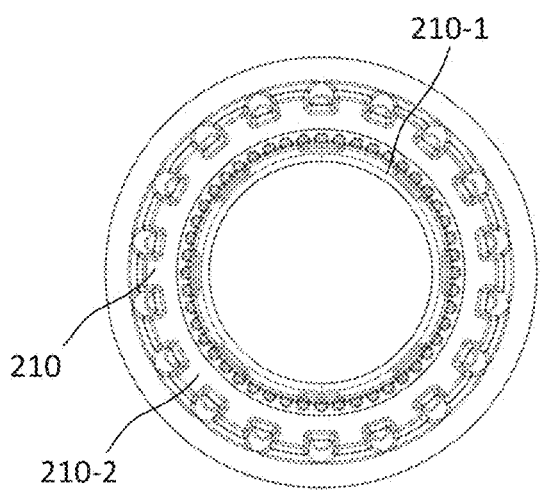
FIG. 60 is a second end view of the second part assembly shown in FIG. 57.
Figure 61:
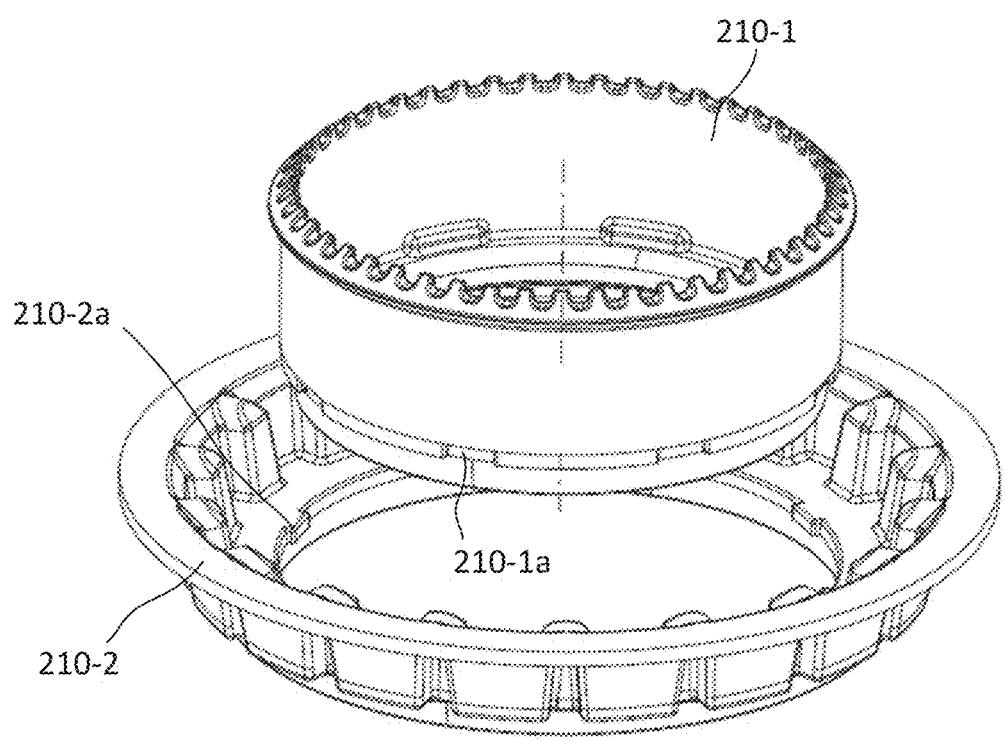
FIG. 61 is a perspective exploded view of the second part assembly shown in FIG. 57.

As most easily seen at FIGS. 25, 34, and 35, the filter cartridge 100 and the filter cartridge 150 are provided with seal arrangements that differ from those shown in the first example. Rather than having a polygonal shape, the seal arrangement associated with the end cap 104 of the filter cartridge 100 has a radially outward facing seal surface 104a with a lobed structure while the seal arrangement associated with the end cap 154 of the filter cartridge 150 has a radially outward facing seal surface 154a with a generally cylindrical shape. Consequently, the second part 210 is configured with a sidewall 212 that has an outwardly facing cylindrically shaped seal surface 212a while the sidewall 214 has a radially inward facing lobed shape. PCT Publication WO 2013063497, incorporated by reference in its entirety herein, shows and describes various examples of lobed shaped surfaces that may be provided for filter cartridge 100 and second part 210 without departing from the concepts presented herein.

Examples of FIGS. 36 to 55

The examples presented at FIGS. 36 to 55 show additional variations of the seal surfaces associated with the filter cartridges 100, 150 and second part 210 while having the same general attachment and interface structure on the first and second parts 208, 210 as shown for the example shown at FIGS. 24 to 35. As the air cleaner construction is generally the same for these embodiments, FIGS. 36 to 55 depict only the filter cartridges 100, 150 and the first and second parts 208, 210.

Referring to FIGS. 36 to 40, it can be seen that the filter cartridge 100 is provided with an end cap 104 presenting a radially inward facing seal surface 104a that has a generally cylindrical shape while the filter cartridge 150 is provided with an end cap 154 presenting a radially outward facing seal surface 154a that has a generally cylindrical shape. It can also be seen at FIG. 36 that the first part 208 is provided with a straight outlet 202c in contrast to the elbow-shaped outlets of other examples. With the disclosed example, a single cylindrically shaped wall structure 214 is provided for sealing with the filter cartridges 100, 150. As can be seen at FIGS. 37 to 40, the wall structure 214 has a seal surface 214a-1 facing in a radially outward direction for sealing to the filter cartridge seal surface 104a and an opposite seal surface 214a-2 facing in a radially inward direction for sealing to the filter cartridge seal surface 154a. In some examples, the filter cartridge 100 can be alternatively provided with a radially outward facing seal surface 104a and the second part 210 can be provided with an additional wall structure presenting a seal surface facing in a radially inward direction. Similarly, the filter cartridge 150 could be provided with a radially inward facing seal surface 154a that seals against a radially outward facing surface presented by the second part 210.

Referring to FIGS. 41 to 45, another example is presented that is generally similar to that shown in FIGS. 36 to 40 but where the sealing surfaces 104a, 154a, 214a-1, and 214a-2 are provided with longitudinally extending rib structures instead of being smooth cylindrical surfaces. PCT Publication WO 2017139673, incorporated by reference in its entirety herein, shows and describes various examples of ribbed shaped surfaces that may be provided for filter cartridge 100, filter cartridge 150, and second part 210 without departing from the concepts presented herein.

Referring to FIGS. 46 to 50, another example is presented that is generally similar to that shown in FIGS. 36 to 40 in that the wall structure 214 has a generally cylindrical shape and is configured for sealing with a filter cartridge 150 have an outwardly facing radial seal surface 154a. However, in this example, the second part 210 includes additional lobe shaped wall structures 215 radially arranged about the wall structure 214 and defining seal surfaces 215*a*. In the disclosed arrangement, the seal surfaces 215*a* and 214*a* cooperatively form the sealing surface for the filter cartridge 100 which has a correspondingly shaped seal surface 104*a* that faces in a radially inward direction. PCT Publication WO 2025085786, incorporated by reference in its entirety herein, shows and describes various examples of lobed structures that may be provided for filter cartridge 100 and the second part 210 without departing from the concepts presented herein.

Referring to FIGS. 51 to 55, an example is presented that is similar to the example presented in FIGS. 24 to 35 in that the wall structure 212 and filter cartridge seal surface 154*a* are similarly configured. However, the wall structure 214 and corresponding seal surface 214*a* are provided with a single lobe 217 rather than a plurality of lobes as is shown in the earlier embodiment. More or fewer lobes may be provided, such as two lobes. The filter cartridge 100 of this example similarly includes an end cap 104 presenting a radially inward sealing surface 104*a* having a single lobed structure 104*b*. In the example shown, the filter cartridge 100 is additionally provided with an apertured outer support structure or tube 103 and an end cap 104 that is elastically deformable such that the lobed structure 104*b* can be displaced within the support structure 103. With such an arrangement, the filter cartridge 100 can be installed in only a single rotational orientation with respect to the second part 210. PCT Publication WO 2024254498, incorporated by reference in its entirety herein, shows and describes various examples of lobed structures that may be provided for filter cartridge 100 and second part 210 without departing from the concepts presented herein.

Example of FIGS. 56 to 61

Referring to FIGS. 56 to 61 an additional example is presented to illustrate that the second part 210 can be provided in multiple pieces and joined to the first part 208 at a weld joint of the type described above. As shown, the second part 210 is formed by a first part 210-1 and a second part 210-2. As shown, the first part 210-1 defines a sidewall 214 with oppositely facing cylindrically shaped seal surfaces 214*a*-1 and 214*a*-2 for respectively forming a seal with the seal surfaces 104*a*, 154*a* of the filter cartridges 100, 150. The second part 210-2 defines a sidewall 212 that has a radially inward facing lobed surface 212*a* for radially supporting a similarly shaped outer perimeter of the filter cartridge end cap 104. As most easily seen at FIG. 61, the separate wall structures 210-1 and 210-2 may be joined together via a snap-fit type connection via cooperating protrusions and slots which may be provided on either or both wall structures 210-1, 210-2. In the example shown, protrusions 210-2*a* are provided on wall structure 210-2 while slots 210-1*a* are provided on wall structure 210-1. Other joining methods may be used as well, such as adhesives, plastic welding techniques (e.g., ultrasonic welding, spin welding, solvent welding, etc.) and/or mechanical fasteners. As can be seen most easily at FIG. 56, the interconnected wall structures 210-1, 210-2 are joined to the wall structure 210 at a tongue and groove type joint and are secured together at a weld joint, such as one that could be performed through a spin welding technique as described above. In the example shown, the wall structures 210-1, 210-2 cooperatively form a groove via spaced apart circumferential wall structures 210*e*, 210*f* that receive a circumferential wall structure 208*f* associated with the first part 208. As each of the wall structures 210-1, 210-2 is effectively sealed to the first part 208 with a fused or welded attachment, the potential for undesirable leakage is minimized. Further, providing the parts 210-1, 210-2, and 208 in separate pieces allows for greater ease of manufacturing, such as molding, while also advantageously providing for a degree of modularity to accommodate differently sized and/or shaped housings and outlets. As can also be seen at FIG. 56, the seal surface 214*a*-1 is provided as a recessed or undercut portion of the sidewall 214 as a radial protrusion is provided at the distal end of the sidewall 214. The end cap 104 is provided with a cooperatively shaped recess for accommodating the protrusion such that the seal surface 104*a* can form a seal against the seal surface 214*a*-1. Other configurations are possible.

Example of FIGS. 62 to 65

Figure 62:
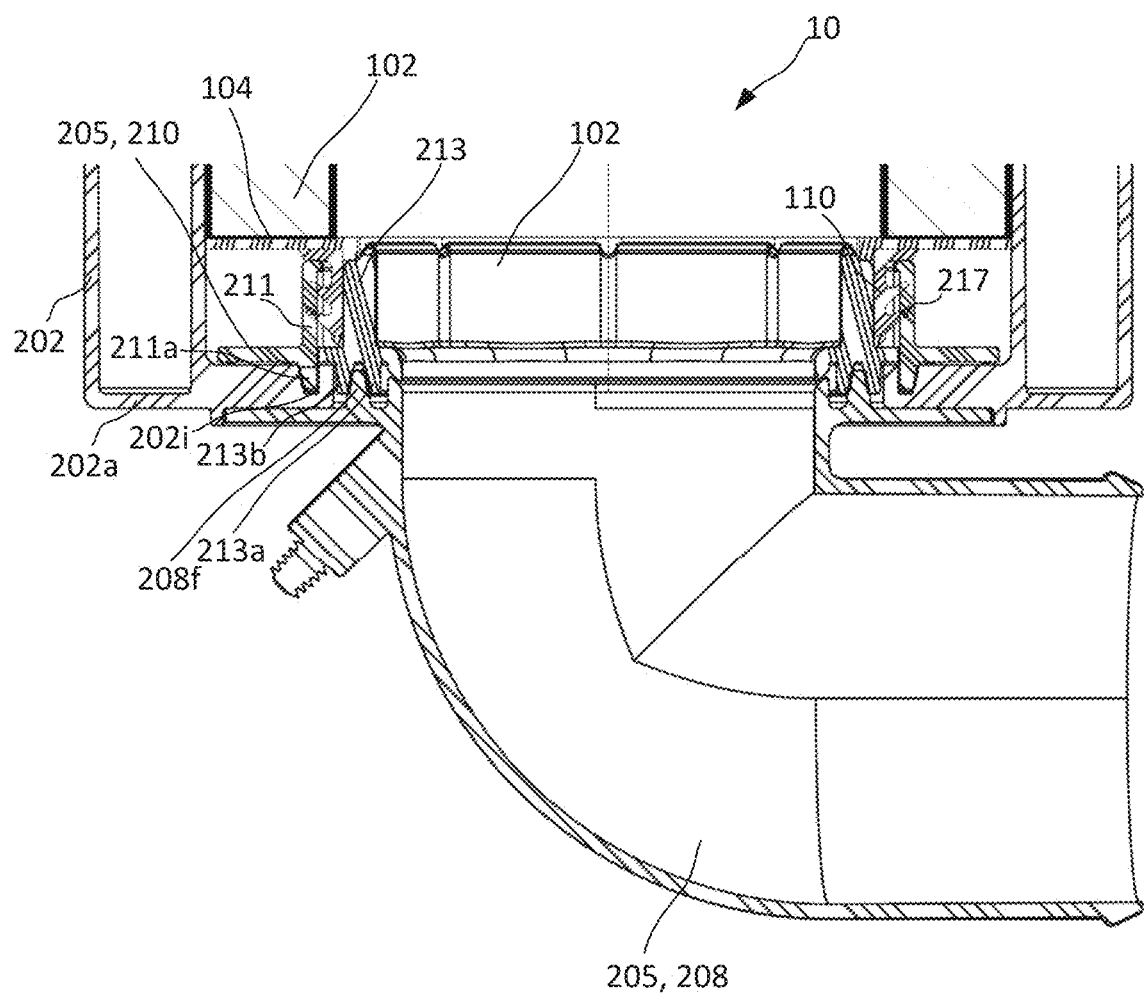
FIG. 62 is a schematic partial cross-sectional view of an example of an air cleaner assembly, with an outlet tube assembly, having features in accordance with the present disclosure.
Figure 63:
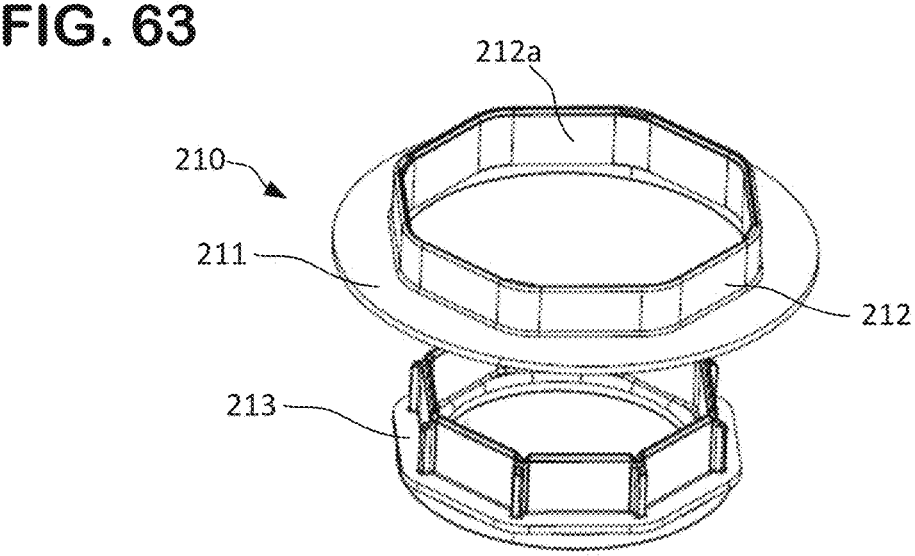
FIG. 63 is a first perspective exploded view of a second part assembly of the outlet tube assembly shown in FIG. 62.
Figure 64:
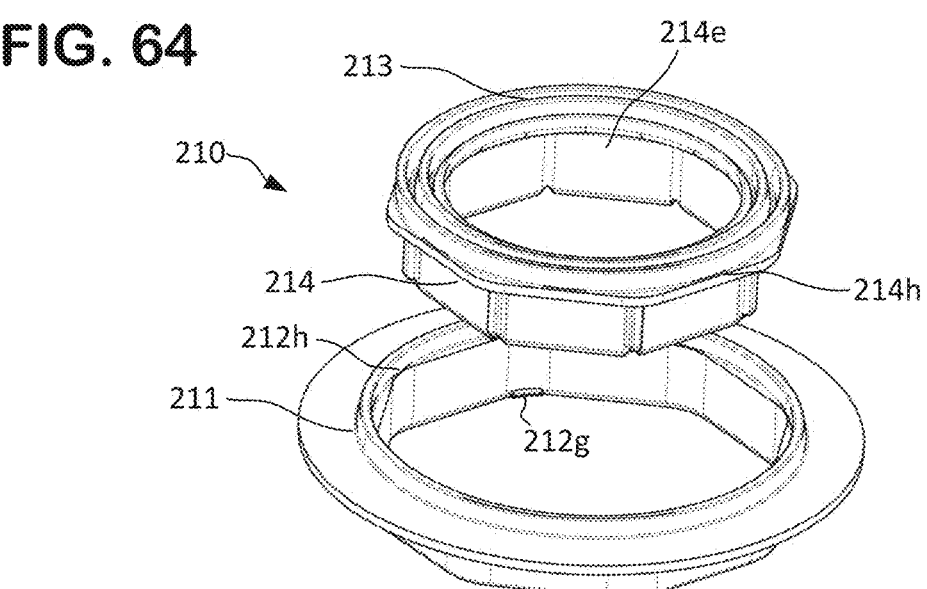
FIG. 64 is a second perspective exploded view of the second part assembly shown in FIG. 63.

Referring to FIGS. 62 to 65 an additional example is presented to illustrate another example of a second part 210 that can be provided in multiple pieces 211, 213 and joined to the first part 208 at a weld joint of the type described above. As most easily seen at FIGS. 63, the second part 210 of this example is provided with a first piece 211 having a sidewall 212 defining a generally polygonal shaped, radially inward facing seal surface 212*a* for the filter cartridge 100. The second part 210 is also provided with a second piece 213 having a sidewall 214 defining a generally polygonal shaped, radially inward facing seal surface 214*a* for the filter cartridge 150. Accordingly, the second part 210 is configured to receive two filter cartridges 100, 150 that each have a radially outward facing seal surface. With reference to FIG. 62, it can be seen that at least the filter cartridge 100 can be provided with a lip seal arrangement 217. Filter cartridge 150 can be similarly configured. In one aspect, the parts 211, 213 can be provided with snap-fit type and/or interlocking type connection features 212*h*, 214*h* to enable the parts 211, 213 to be connected to each other to form an assembled second part 210. Other means may be used as well, such as adhesives or welding processes. Further, as most easily viewed at FIGS. 64 and 65, the wall structure 212 can be provided with spaced apart radially inward protrusions 212*g* radially aligned with the corner portions of the seal surface 212*a* to form an undercut feature in which the seal surface 212*a* is recessed from the innermost portion of the protrusions 212*g*. With such a feature, the seal member 110 of the filter cartridge end cap 104 deforms inwardly as the seal member 110 moves past the protrusions 212*g* and then, in an installed state as shown at FIG. 62, moves towards the seal surface 212*a* to form the seal while accommodating the presence of the protrusions at a location between the seal surface 212*a* and the end of the media pack 102. The disclosed protrusion arrangement 212*g* can be characterized as forming part of a local or localized undercut arrangement.

Figure 65:
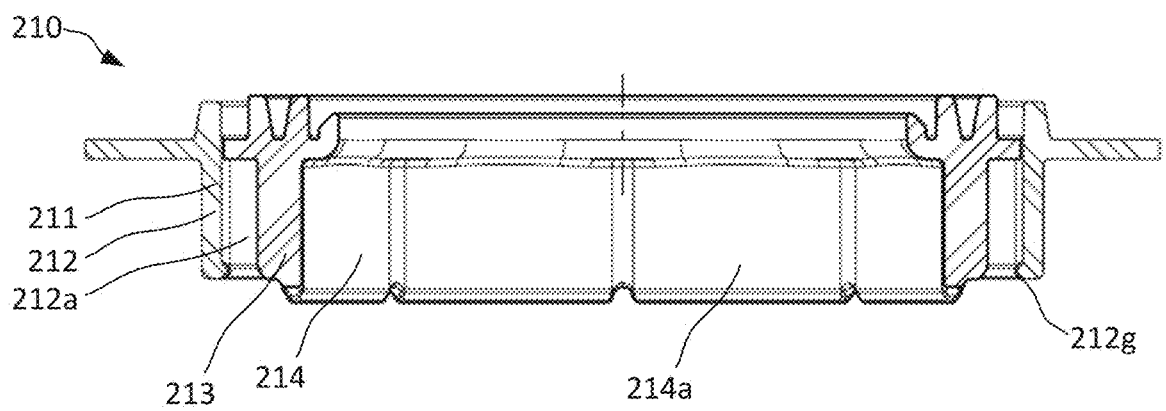
FIG. 65 is a cross-sectional side view of the second part assembly shown in FIG. 63.

As most easily seen at FIGS. 62 and 65, the piece 213 of the second part 210 is provided with circumferential wall structures 213*a*, 213*b* that form a groove structure for receiving a tongue formed by a circumferential wall structure 208*f* of the first part 208. The wall structures 213*a*, 213*b*, 208*f* are joined together as described above for other examples to form a permanent weld joint. To aid in rotationally guiding the outlet tube assembly 205, the piece 211 is provided with a circumferential wall structure 211*a* that is received by a circumferential groove in the end wall 202*b* of the housing body 202. Although provided in two pieces, the connections between the second part 210 and the first part 208 and to the housing body 202 are generally similar to the features shown and described for FIGS. 24 to 28. Accordingly, the description for that example is applicable for this example and need not be repeated further here.

Filtration Media Types

Any type of filter media can be used as the media pack 102, 152 for the above-disclosed filter cartridges 100, 150. Further, the media type for filter cartridge 100 may be the same type or a different type of media than that for an associated filter cartridge 150 that may also be present in the air cleaner housing. For example, the filter cartridge 100 may have pleated or fluted type media while another filter cartridge 150 may be provided with non-woven media, respectively. Examples of media types suitable for use with filter cartridges 100 and 150 are provided below.

For safety or secondary filter applications, thin non-woven media constructions represent the simplest form of filter media. These typically employ non-woven fibrous materials arranged in a simple tubular configuration, providing a lightweight secondary filtration layer. The media can be made from cellulose fibers, synthetic fibers (such as polyolefin, polyamide, polyester, polyvinyl chloride, and polyvinyl alcohol), or combinations thereof. This simpler construction offers good particle capture efficiency while maintaining low restriction to airflow, making it an economical yet effective choice for secondary filtration.

Depth media consists of a relatively thick layer of fibrous material that captures particles throughout its depth rather than just on the surface. This type of media relies on its three-dimensional structure to trap contaminants as fluid passes through the thickness of the material. Depth media can be made from various fiber types including cellulose and synthetic materials and may be used alone or in combination with other media types.

Pleated media arrangements include media arranged in a tubular manner with pleats extending between opposite flow ends. The pleated media can be provided with varying pleat depths and may include support structures or spacers to help maintain the pleat configuration and reduce masking between adjacent pleats.

Alternative media arrangements include embossed sheet configurations where an embossed sheet is secured to either a non-embossed sheet or another embossed sheet to create flow channels. The media can also utilize combinations of different materials—for example, one sheet may contain cellulose fibers while another contains synthetic fibers like polyester, polyethylene, polypropylene or other polymeric materials. The media sheets can be treated with additional materials or fine fibers to enhance filtration performance.

Z-filter or fluted media constructions represent another media configuration, involving a corrugated or fluted sheet combined with a facing sheet to create parallel inlet and outlet fluid flow channels. The fluted sheet can have regular curved wave patterns of alternating ridges and troughs, with the facing sheet secured to the fluted sheet to define the flow channels. The combined sheets can be coiled into a cylindrical configuration or stacked into a block form. The flutes may be straight or tapered along their length, and various flute shapes including semicircular, rectangular, or undulating configurations are possible.

The filter media can be configured for straight-through flow between opposite inlet and outlet ends or for forward flow or reverse flow in which the flow enters through the sides of the media. Further, the media pack can be formed into various shapes including circular, oval, racetrack, or polygonal cross-sections to accommodate different housing designs and space constraints.

Additional details regarding z-filter constructions and media configurations can be found in U.S. Pat. Nos. 5,820,646; 5,772,883; 5,902,364; 5,792,247; 5,895,574; 6,210,469; 6,190,432; 6,350,291; 6,179,890; 6,235,195; Des. 399,944; Des. 428,128; Des. 396,098; Des. 398,046; Des. 437,401; U.S. Patent Application Publication Nos. US 2014/0208705 A1; US 2018/0207566; US 2009/0127211; US 2008/0282890; US 2010/0032365; and PCT Publications WO 97/40918; WO 04/007054; WO 04/082795; WO 05/077487, each of which is incorporated herein by reference.

Aspects

The present disclosure includes various aspects that may be claimed in the future. The following aspects are intended to highlight certain features without limiting the scope of protection. It should be understood that any of the following aspects may be claimed in a patent application claiming priority to the present disclosure, either alone or in combination with other aspects. Further, the following aspects may be modified or combined in any suitable manner apparent to one skilled in the art in light of the teachings herein. Features which are described in the context of separate aspects and embodiments of the disclosure may be used together and/or be interchangeable. Similarly, features described in the context of a single embodiment may also be provided separately or in any suitable subcombination. The aspects are numbered for convenience only and should not be construed as requiring a particular order or limiting the scope of what may be claimed. In various aspects, an air cleaner housing and related filter cartridges are provided that include features and components as described in one or more of the following aspects. The aspects may be combined or modified in ways apparent to those skilled in the art based on the teachings herein. While specific materials, dimensions, and configurations are described for certain aspects, these are exemplary only and other materials, dimensions and configurations may be used within the scope of the disclosure.

Aspect 1: An air cleaner housing, the air cleaner housing comprising: a) a main body defining an interior volume and including an end wall defining a first axial opening with a first diameter; and b) an outlet assembly secured to the main body at the location of the first axial opening and including: i) a first part having a first radial flange located on an interior side of the main body end wall and having a first circumferential wall structure, the first part defining a radial sealing surface for a filter cartridge; ii) a second part coupled to the first part, the second part having a second radial flange located on an exterior side of the main body end wall and having a second circumferential wall structure, the second part defining an air inlet or outlet opening; iii) wherein the first and second circumferential wall structures are permanently joined together at a circumferential weld joint such that the main body end wall is between the first radial flange and the second radial flange and such that the outlet assembly is rotatable with respect to the main body.

Aspect 2: The air cleaner housing of Aspect 1, or any of Aspects 3 to 33, further including a third circumferential wall structure located on either of the first and second parts and arranged such that the first, second, and third circumferential wall structures form a tongue and groove circumferential weld joint.

Aspect 3: The air cleaner housing of Aspect 1, or any of Aspects 2 and 4 to 33, wherein the main body defines a third circumferential wall structure located adjacent to an outer edge of the first or second radial flange.

Aspect 4: The air cleaner housing of Aspect 1, or any of Aspects 2 to 3 and 5 to 33, wherein the first part defines a third circumferential wall structure and the second part defines a fourth circumferential wall structure, wherein distal ends of the third and fourth circumferential wall structures are coaxially aligned and extend towards each other.

Aspect 5: The air cleaner housing of Aspect 1, or any of Aspects 2 to 4 and 6 to 33, wherein an innermost diameter of the circumferential weld joint is greater than an inside diameter of the air inlet or outlet opening of the first part.

Aspect 6: An air cleaner housing, the air cleaner housing comprising: a) a main body including an end wall defining a first axial opening with a first diameter; b) a cover removably secured to the main body such that the cover and main body cooperatively define an interior volume; and c) an outlet assembly secured to the main body at the location of the first axial opening and including: i) a first part having a maximum radial dimension that is greater than the first diameter and is located on an interior side of the main body end wall, the first part defining a radial sealing surface; ii) a second part coupled to the first part, the second part having a maximum dimension that is greater than the first diameter and located on an exterior side of the main body end wall, the second part defining an air inlet or outlet opening; iii) wherein the first part and the second part are permanently joined together at a circumferential weld joint such that the main body end wall is between the first and second parts and such that the outlet assembly is rotatable with respect to the main body.

Aspect 7: The air cleaner housing of Aspect 6, or any of Aspects 1 to 5 and 8 to 33, wherein the circumferential weld joint has a radial component.

Aspect 8: The air cleaner housing of Aspect 6, or any of Aspects 1 to 5, 7, and 9 to 33, wherein the first and second parts are each formed from a polymeric material.

Aspect 9: The air cleaner housing of Aspect 8, or any of Aspects 1 to 7 and 10 to 33, wherein the first and second parts are each formed from a polypropylene material.

Aspect 10: The air cleaner housing of Aspect 6, or any of Aspects 1 to 5, 7 to 9, and 11 to 33, wherein the circumferential weld joint is located at an interface between a first circumferential wall structure associated with the first part and a second circumferential wall structure associated with the second part.

Aspect 11: The air cleaner housing of Aspect 10, or any of Aspects 1 to 9 and 12 to 33, wherein one of the first and second circumferential wall structures defines a tongue and the other of the first and second circumferential wall structures defines a groove, and wherein the circumferential weld joint is formed between the tongue and groove.

Aspect 12: The air cleaner housing of Aspect 11, or any of Aspects 1 to 10 and 13 to 33, wherein the tongue is associated with the first wall structure and the groove is associated with the second wall structure.

Aspect 13: The air cleaner housing of Aspect 11, or any of Aspects 1 to 10, 12, and 14 to 33, wherein the tongue is associated with the second wall structure and the groove is associated with the first wall structure.

Aspect 14: The air cleaner housing of Aspect 11, or any of Aspects 1 to 10, 11-13, and 15 to 33, wherein the first or second part defines a third wall structure and the main body end wall defines a fourth wall structure, wherein the third and fourth wall structures are slidable with respect to each other to form cooperating guide surfaces.

Aspect 15: The air cleaner housing of Aspect 14, or any of Aspects 1 to 13, and 16 to 33, wherein the one of the third and fourth circumferential wall structures defines a tongue and the other of the third and fourth circumferential wall structures defines a groove.

Aspect 16: The air cleaner housing of Aspect 15, or any of Aspects 1 to 14 and 17 to 33, wherein the tongue is associated with the third wall structure and the groove is associated with the fourth wall structure.

Aspect 17: The air cleaner housing of Aspect 15, or any of Aspects 1 to 14, 16, and 18 to 33, wherein the tongue is associated with the fourth wall structure and the groove is associated with the third wall structure.

Aspect 18: The air cleaner housing of Aspect 14, or any of Aspects 1 to 13, 15 to 17, and 19 to 33, wherein the third and fourth wall structures are located radially outward from the first and second wall structures.

Aspect 19: The air cleaner housing of Aspect 14, or any of Aspects 1 to 13, 15 to 18, and 20 to 33, wherein the first part defines the third circumferential wall structure and wherein the fourth circumferential wall structure is located on the interior side of the end wall structure.

Aspect 20: The air cleaner housing of Aspect 14, or any of Aspects 1 to 13, 15 to 19, and 21 to 33, wherein the second part defines the third circumferential wall structure and wherein the fourth circumferential wall structure is located on the exterior side of the end wall structure.

Aspect 21: The air cleaner housing of Aspect 1, or any of Aspects 2 to 20 and 22 to 33, wherein the second part is formed from a plurality of parts.

Aspect 22: The air cleaner housing of Aspect 21, or any of Aspects 1 to 20, 21, and 23 to 33, wherein the second part is formed from a first piece and a second piece, wherein both of the first and second pieces is joined to the first part at the weld joint.

Aspect 23: The air cleaner housing of Aspect 21, or any of Aspects 1 to 20, 22, and 24 to 33, wherein the second part is formed from a first piece and a second piece, wherein only one of the first and second pieces is joined to the first part at the weld joint.

Aspect 24: The air cleaner housing of Aspect 21, or any of Aspects 1 to 20, 22 to 23, 25 to 33, wherein the radial sealing surface is an undercut radial sealing surface.

Aspect 25: An air cleaner comprising: a) the air cleaner housing of any preceding aspect; and b) a filter cartridge including an end cap with a seal member sealed to the radial sealing surface.

Aspect 26: The air cleaner of Aspect 25, or any of Aspects 1 to 24 and 27 to 33, wherein the seal member includes a plurality of lip seals presenting a radially outward facing seal surface.

Aspect 27: The air cleaner of Aspect 25, or any of Aspects 1 to 24, 26, and 28 to 33, wherein the seal member faces in a radially inward direction.

Aspect 28: A method of manufacturing an air cleaner housing, the method comprising: a) providing a main body including an end wall defining a first axial opening with a first diameter; b) providing a first part having a maximum radial dimension greater than the first diameter; c) providing a second part having a maximum radial dimension greater than the first diameter and defining an air outlet opening; d) positioning the first part on an interior side of the main body end wall; e) positioning the second part on an exterior side of the main body end wall such that the main body end wall is between the first and second parts; f) rotating the first or second part relative to the other of the first and second part in a spin welding process to permanently join the first part and the second part together at a circumferential weld joint, wherein the resulting outlet assembly is rotatable with respect to the main body.

Aspect 29: The method of Aspect 28, or any of Aspects 1 to 27 and 30 to 33, further comprising: a) fixing one of the first and second parts against rotation.

Aspect 30: The method of Aspect 29, or any of Aspects 1 to 28 or 31 to 33, wherein the step of fixing one of the first and second parts against rotation includes fixing the first part.

Aspect 31: The method of Aspect 29, or any of Aspects 1 to 28, 30, and 32 to 33, wherein the step of fixing one of the first and second parts against rotation includes fixing the second part.

Aspect 32: The method of Aspect 28, or any of Aspects 1 to 27, 30 to 31, and 33, further comprising: a) fixing the main body against rotation.

Aspect 33: The method of Aspect 28, or any of Aspects 1 to 27 and 29 to 32, further comprising: a) after the rotating step, holding the first and second parts together under pressure for a period of time.

SUMMARY

The principles described herein can be applied in a variety of filter assemblies. Examples described in which the principles applied to (air) gas filter assemblies. Examples are described include air filters, for example, air filters used for treating engine intake airflows. The principles can be applied to a variety of alternate gas filtration arrangements, in some instances even with liquid filter assemblies. Again, the principles, techniques, and features described herein can be applied in a variety of systems, and there is no requirement that all of the advantageous features identified be incorporated in an assembly, system or component to obtain some benefit according to the present disclosure.

What is claimed is:

1. An air cleaner housing, the air cleaner housing comprising:
   a) a main body defining an interior volume and including an end wall defining a first axial opening with a first diameter; and
   b) an outlet assembly secured to the main body at the location of the first axial opening and including:
      i) a first part having a first radial flange located on an interior side of the main body end wall and having a first circumferential wall structure, the first part defining a radial sealing surface for a filter cartridge;
      ii) a second part coupled to the first part, the second part having a second radial flange located on an exterior side of the main body end wall and having a second circumferential wall structure, the second part defining an air inlet or outlet opening;
      iii) wherein the first and second circumferential wall structures are permanently joined together at a circumferential weld joint such that the main body end wall is between the first radial flange and the second radial flange and such that the outlet assembly is rotatable with respect to the main body; and
      iv) wherein a third circumferential wall structure is provided on either of the first and second parts and is arranged such that the first, second, and third circumferential wall structures form a tongue and groove circumferential weld joint.

2. The air cleaner housing of claim 1, wherein the main body defines a fourth circumferential wall structure located adjacent to an outer edge of the first or second radial flange.

3. The air cleaner housing of claim 1, wherein an innermost diameter of the circumferential weld joint is greater than an inside diameter of the air inlet or outlet opening of the second part.

4. An air cleaner housing, the air cleaner housing comprising:
   a) a main body defining an interior volume and including an end wall defining a first axial opening with a first diameter; and
   b) an outlet assembly secured to the main body at the location of the first axial opening and including:
      i) a first part having a first radial flange located on an interior side of the main body end wall and having a first circumferential wall structure, the first part defining a radial sealing surface for a filter cartridge;
      ii) a second part coupled to the first part, the second part having a second radial flange located on an exterior side of the main body end wall and having a second circumferential wall structure, the second part defining an air inlet or outlet opening;
      iii) wherein the first and second circumferential wall structures are permanently joined together at a circumferential weld joint such that the main body end wall is between the first radial flange and the second radial flange and such that the outlet assembly is rotatable with respect to the main body;
      iv) wherein the first part defines a third circumferential wall structure and the second part defines a fourth circumferential wall structure, wherein distal ends of the third and fourth circumferential wall structures are coaxially aligned and extend towards each other.

5. An air cleaner housing, the air cleaner housing comprising:
   a) a main body including an end wall defining a first axial opening with a first diameter;
   b) a cover removably secured to the main body such that the cover and main body cooperatively define an interior volume; and
   c) an outlet assembly secured to the main body at the location of the first axial opening and including:
      i) a first part having a maximum radial dimension that is greater than the first diameter and is located on an interior side of the main body end wall, the first part defining a radial sealing surface;
      ii) a second part coupled to the first part, the second part having a maximum dimension that is greater than the first diameter and located on an exterior side of the main body end wall, the second part defining an air inlet or outlet opening;
      iii) wherein the first part and the second part are permanently joined together at a circumferential weld joint such that the main body end wall is between the first and second parts and such that the outlet assembly is rotatable with respect to the main body;
      iv) wherein one of the first and second circumferential parts defines a tongue and the other of the first and second parts defines a groove, and wherein the circumferential weld joint is formed between the tongue and groove.

6. The air cleaner housing of claim 5, wherein the circumferential weld joint has a radial component.

7. The air cleaner housing of claim 5, wherein the first and second parts are each formed from a polymeric material.

8. The air cleaner housing of claim 7, wherein the first and second parts are each formed from a polypropylene material.

9. The air cleaner housing of claim 5, wherein the circumferential weld joint is located at an interface between a first circumferential wall structure associated with the first part and a second circumferential wall structure associated with the second part.

10. The air cleaner housing of claim 9, wherein the tongue is associated with the first wall structure and the groove is associated with the second wall structure.

11. The air cleaner housing of claim 9, wherein the tongue is associated with the second wall structure and the groove is associated with the first wall structure.

12. The air cleaner housing of claim 9, wherein the first or second part defines a third wall structure and the main body end wall defines a fourth wall structure, wherein the third and fourth wall structures are slidable with respect to each other to form cooperating guide surfaces.

13. The air cleaner housing of claim 12, wherein the one of the third and fourth circumferential wall structures defines a tongue and the other of the third and fourth circumferential wall structures defines a groove.

14. The air cleaner housing of claim 13, wherein the tongue is associated with the third wall structure and the groove is associated with the fourth wall structure.

15. The air cleaner housing of claim 13, wherein the tongue is associated with the fourth wall structure and the groove is associated with the third wall structure.

16. The air cleaner housing of claim 12, wherein the third and fourth wall structures are located radially outward from the first and second wall structures.

17. The air cleaner housing of claim 12, wherein the first part defines the third circumferential wall structure and wherein the fourth circumferential wall structure is located on the interior side of the end wall structure.

18. The air cleaner housing of claim 12, wherein the second part defines the third circumferential wall structure and wherein the fourth circumferential wall structure is located on the exterior side of the end wall structure.

* * * * *